(12) United States Patent
Varanasi et al.

(10) Patent No.: US 11,987,657 B2
(45) Date of Patent: May 21, 2024

(54) DURABLE WATER RESISTANT COATINGS

(71) Applicant: Massachusetts Institute of Technology, Cambridge, MA (US)

(72) Inventors: Kripa K. Varanasi, Lexington, MA (US); Karen K. Gleason, Cambridge, MA (US); Dan Soto, Boston, MA (US); Asli Ugur Katmis, Allston, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 629 days.

(21) Appl. No.: 16/635,990

(22) PCT Filed: Aug. 2, 2018

(86) PCT No.: PCT/US2018/045039
§ 371 (c)(1),
(2) Date: Jan. 31, 2020

(87) PCT Pub. No.: WO2019/028271
PCT Pub. Date: Feb. 7, 2019

(65) Prior Publication Data
US 2020/0181415 A1    Jun. 11, 2020

Related U.S. Application Data

(60) Provisional application No. 62/668,160, filed on May 7, 2018, provisional application No. 62/540,130, filed on Aug. 2, 2017.

(51) Int. Cl.
*C08F 220/24* (2006.01)
*B05D 1/00* (2006.01)
(Continued)

(52) U.S. Cl.
CPC .............. *C08F 220/24* (2013.01); *B05D 1/60* (2013.01); *C08F 214/18* (2013.01);
(Continued)

(58) Field of Classification Search
CPC ............ C08F 218/20; C08F 220/22–24; C08F 222/18–185; C08F 2810/20;
(Continued)

(56) References Cited

U.S. PATENT DOCUMENTS 5,356,344 A    10/1994 Lemieux
5,919,555 A  *  7/1999 Yasuda ................... C08J 7/043
                                                          428/421
(Continued)

FOREIGN PATENT DOCUMENTS

JP     2012158720 A  *  8/2012
WO    2000/038845 A1    7/2000

OTHER PUBLICATIONS

Liu et al., Cross-linking and ultrathin grafted gradation of fluorinated polymers synthesized via initiated chemical vapor deposition to prevent surface reconstruction. Langmuir. Dec. 2, 2014;30(47):14189-94. doi: 10.1021/la503343x. Epub Nov. 17, 2014.
(Continued)

*Primary Examiner* — Ling Siu Choi
*Assistant Examiner* — David L Miller
(74) *Attorney, Agent, or Firm* — Wolf, Greenfield & Sacks, P.C.

(57) ABSTRACT

Polymers comprising fluorinated side chains that can be used for water resistance coatings on substrates and are deposited by initiated chemical vapor deposition are generally described.

14 Claims, 11 Drawing Sheets

(51) Int. Cl.
*C08F 214/18* (2006.01)
*C08F 236/04* (2006.01)
*C09D 4/00* (2006.01)
*C09D 5/00* (2006.01)
*C09D 147/00* (2006.01)
*D21H 19/22* (2006.01)
*D21H 21/16* (2006.01)
*C08F 14/18* (2006.01)
*C08F 220/22* (2006.01)
*D03D 15/283* (2021.01)

(52) U.S. Cl.
CPC ............ *C08F 236/045* (2013.01); *C09D 4/00* (2013.01); *C09D 5/00* (2013.01); *C09D 147/00* (2013.01); *D21H 19/22* (2013.01); *D21H 21/16* (2013.01); *C08F 14/18* (2013.01); *C08F 220/22* (2013.01); *C08F 2800/20* (2013.01); *C08F 2810/20* (2013.01); *C08F 2810/50* (2013.01); *D03D 15/283* (2021.01); *D10B 2331/04* (2013.01)

(58) Field of Classification Search
CPC ................... C08F 214/18; C08F 214/182; C08F 214/186; C08F 14/18; C08F 14/185; B05D 1/60; C09D 5/00; C09D 5/16; C09D 147/00; D21H 19/20–22; D21H 21/16
See application file for complete search history.

(56) References Cited

U.S. PATENT DOCUMENTS

| | | | |
|---|---|---|---|
| 6,660,339 B1* | 12/2003 | Datta | C23C 14/582 |
| | | | 427/255.6 |
| 6,747,179 B1* | 6/2004 | DeSimone | B01J 31/006 |
| | | | 568/454 |
| 9,163,307 B2 | 10/2015 | Gleason et al. | |
| 2002/0042470 A1 | 4/2002 | Moore et al. | |
| 2005/0042963 A1 | 2/2005 | Adam et al. | |
| 2006/0143770 A1 | 7/2006 | Ziakas | |
| 2013/0171546 A1 | 7/2013 | White et al. | |
| 2013/0209734 A1 | 8/2013 | Sebó | |
| 2013/0280485 A1* | 10/2013 | Coclite | C09D 133/16 |
| | | | 427/535 |
| 2014/0314982 A1* | 10/2014 | Paxson | B05D 5/083 |
| | | | 427/255.39 |
| 2014/0322455 A1 | 10/2014 | Im et al. | |
| 2017/0174928 A1* | 6/2017 | Sigmund | D06M 13/517 |

OTHER PUBLICATIONS

Zhang et al., Microphase Structure, Crystallization Behavior, and Wettability Properties of Novel Fluorinated Copolymers Poly(perfluoroalkyl acrylate-co-stearyl acrylate) Containing Short Perfluorohexyl Chains. Langmuir. Apr. 28, 2015;31(16):4752-60. doi: 10.1021/la504467m. Epub Apr. 15, 2015.
International Search Report and Written Opinion for PCT/US2018/045039, mailed on Oct. 3, 2018.
International Preliminary Report on Patentability for PCT/US2018/045039, mailed on Feb. 13, 2020.

* cited by examiner

DURABLE WATER RESISTANT COATINGS

RELATED APPLICATIONS

This Application is a national stage filing under 35 U.S.C. § 371 of International Patent Application Serial No. PCT/US2018/045039, filed Aug. 2, 2018, entitled "DURABLE WATER RESISTANT COATINGS", which claims priority under 35 U.S.C. § 119(e) to U.S. provisional patent application, U.S. Ser. No. 62/668,160, filed May 7, 2018, entitled "ICVD TECHNIQUE FOR DURABLE WATER RESISTANT COATINGS" and to U.S. provisional patent application, U.S.S.N. 62/540,130, filed Aug. 2, 2017, entitled "ICVD TECHNIQUE FOR DURABLE WATER RESISTANT COATINGS", the entire contents of each of which are incorporated herein by reference.

GOVERNMENT SUPPORT

This invention was made with Government support under W911NF-13-D-0001 awarded by the Army Research Office. The Government has certain rights in the invention.

TECHNICAL FIELD

Articles and methods related to fluid resistant coatings on substrates are generally described.

BACKGROUND

Polymers possessing long fluorinated chains have very low surface tension and are resistant to water and most oils. Due to their remarkable wetting properties, such fluorinated compounds are widely used as the main component of durable water resistant coatings on substrates. Textile coatings of long fluorinated chains are commonly applied via liquid phase processes, which requires forcing the liquid into substrate pores and drying the pores without clogging, often resulting in the generation of waste containing fluorinated moieties. The proper management of such waste poses a significant challenge, as fluorinated chains of eight carbons or more have been shown to persist in the environment and bio-accumulate in living organisms. Because of the related health and safety hazard concerns, governmental agencies are requiring the use of new chemistries with shorter fluorinated chains. Accordingly, improved articles and methods related to fluorinated water resistant coatings on substrates would be desirable.

SUMMARY

Articles and methods related to water resistant coatings on substrates are generally described. The subject matter of the present invention involves, in some cases, interrelated products, alternative solutions to a particular problem, and/or a plurality of different uses of one or more systems and/or articles.

In one set of embodiments, articles are provided. In one embodiment, an article comprises a crosslinked polymer matrix comprising pendant groups. The pendant groups comprise a $C_1$-$C_7$ fluoroalkyl group, and the crosslinked polymer matrix has a water contact angle of greater than 90°.

In another set of embodiments, methods are provided. In one embodiment, a method may comprise vaporizing a first monomer and a second monomer comprising a $C_1$-$C_7$ fluoroalkyl group in the presence of a free-radical initiator, depositing the first monomer and the second monomer on a substrate, and polymerizing the first monomer with the second monomer to form a crosslinked polymer matrix on the substrate, wherein the crosslinked polymer matrix comprises between 30 wt. % and 60 wt. % of the first monomer.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1A:
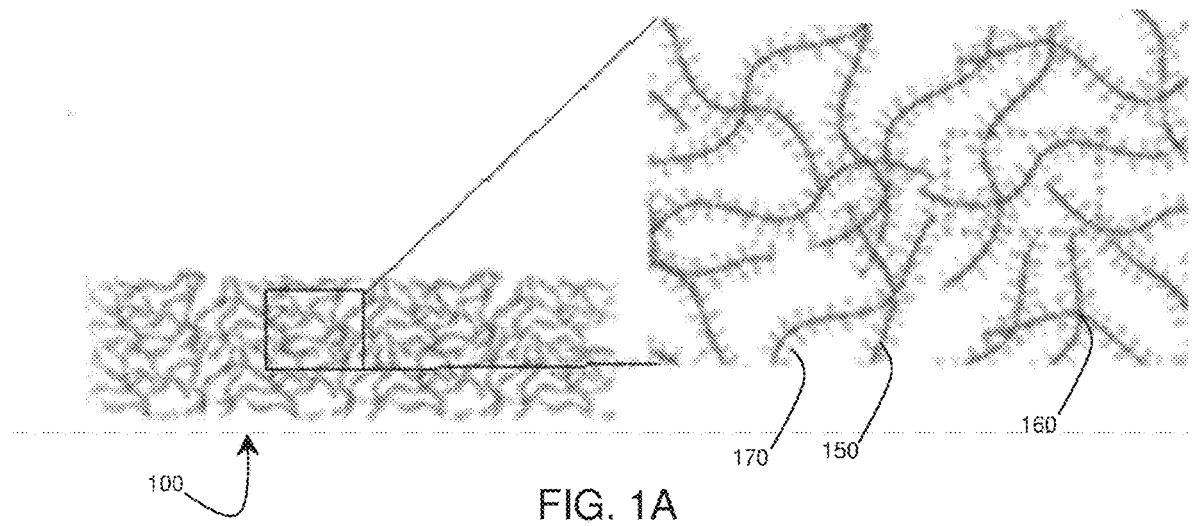
FIG. 1A shows a non-limiting schematic view of a crosslinked polymer matrix comprising pendant groups, according to one set of embodiments.

Articles and methods related to fluid resistant coatings on substrates are generally described. In some embodiments, the fluid resistant coatings described herein comprise short chain fluorinated groups. The fluid resistant coatings may have similar or substantially the same resistance with respect to one or more fluids (e.g., water, oil) as coatings comprising long chain fluorinated groups (e.g., chains comprising greater than or equal to about eight fluorinated carbons), without the associated health and/or safety risks. The fluid resistant coatings described herein may be used for a wide variety of applications, including coatings on fabrics and textured (e.g., sandblasted) surfaces.

Long chain fluorinated compounds have very low surface tension and are therefore resistant (e.g., repellant) to water and most oils. Due to their remarkable wetting properties, such fluorinated compounds are widely used as the main component of water resistant coatings, including coatings on textiles, such as fabrics. Long chain fluorinated compounds (e.g., eight carbons or more), pose a potential risk to both human health and the environment. Such fluorinated compounds contain carbon-fluorine (C—F) bonds that have an average bond dissociation energy of up to 544 kJ/mol, as compared to a value of 439 kJ/mol for a methyl C—H bond, thus making compounds containing C—F bonds more resistant to degradation than their C—H bond containing counterparts. Highly fluorinated compounds have been associated with various cancers, liver malfunction, and hormonal changes. Because they are resistant to chemical decomposition, highly fluorinated compounds can persist in the human body or the environment for years. Accordingly, governmental agencies in the United States of America, such as the Environmental Protection Agency (EPA), have taken various action to help minimize the potential impact of long chain fluorinated compounds (e.g., perfluorodecanoic acid) on human health and the environment.

There is a need for improved water resistant coatings having the beneficial properties (e.g., wetting properties) associated with long chain fluorinated compounds without the detrimental health and environmental impact. In conventional water resistant coatings, water resistance is due at least in part to the ability of long chain fluorinated pendant groups to crystallize and avoid chain reorganization. Short chain fluorinated compounds have been employed as an alternative to long chain fluorinated compounds. However, short chain fluorinated compounds have been found to rearrange when in contact with water, leading to pinning and low water resistance (e.g., small water contact angles). Increasing the rigidity of short chain fluorinated compounds by using various spacer groups have thus far been unsuccessful. Moreover, conventional deposition techniques (e.g., liquid phase deposition, physical vapor deposition) for short chain fluorinated compounds are tedious and complicated.

It has been discovered, within the context of the present disclosure, that certain materials and/or techniques can be used to form a water resistant coating comprising short chain fluorinated groups that has substantially the same or a similar beneficial properties (e.g., wetting properties, durability) as water resistant coating comprising long chain fluorinated groups. In some embodiments, such a coating may include a crosslinked polymer matrix comprising short chain fluorinated pendant groups (e.g., $C_1$-$C_7$ fluoroalkyl groups). The coating may have a water contact angle of greater than 90° and a water contact angle hysteresis of less than 30°, for example. In such cases, the advantageous properties of the crosslinked polymer matrix comprising short chain fluorinated pendant groups (e.g., having less than eight fluorinated carbons) allow the coating to replace conventional coatings comprising long chain fluorinated compounds without sacrificing performance. In some embodiments, the performance of the water resistance coating may be enhanced by the physical texturing of a substrate (e.g., performed by sandblasting). In some embodiments, the crosslinked polymer matrix may be formed by initiated chemical vapor deposition (iCVD). The method of iCVD allows for facile deposition of the crosslinked polymer matrix comprising short chain fluorinated pendant groups as compared to conventional methods of deposition. Additionally, the method of iCVD allows for the deposition of a ultra-thin, conformal, durable, and breathable coating, and consequently, new types of substrate functionalization.

In some embodiments, an article described herein comprises a crosslinked polymer matrix. A non-limiting example of a crosslinked polymer matrix is shown in FIG. 1A. In some embodiments, crosslinked polymer matrix 100 may comprise one or more polymer backbones 150. In certain embodiments, polymer backbones 150 may be connected via crosslinks 160 to form crosslinked polymer matrix 100. In some embodiments, crosslinks 160 may serve to link at least one polymer chain to another polymer chain, thus providing crosslinked polymer matrix 100. At least some of polymer backbones 150 in crosslinked polymer matrix 100 may comprise one or more pendant groups 170. Pendant groups 170 may be present on the surface(s) and/or in the interior of crosslinked polymer matrix 100. In some embodiments, pendant groups 170 may affect one or more properties of crosslinked polymer matrix 100. For instance, according to certain embodiments, pendant groups 170 may affect the structural properties (e.g., rigidity), bonding properties, physical properties, and/or chemical properties of at least a portion of crosslinked polymer matrix 100. In certain embodiments, pendant groups 170 may affect the water resistance of at least a portion of a surface (e.g., top surface, bottom surface, two or more surfaces, all surfaces) of crosslinked polymer matrix 100. In some embodiments, pendant groups 170 may cause a surface of crosslinked polymer matrix 100 to have a greater fluid (e.g., water, oil) contact angle and/or lower fluid (e.g., water, oil) contact angle hysteresis as compared to an essentially identical crosslinked polymer matrix lacking the pendant groups.

Figure 1B:
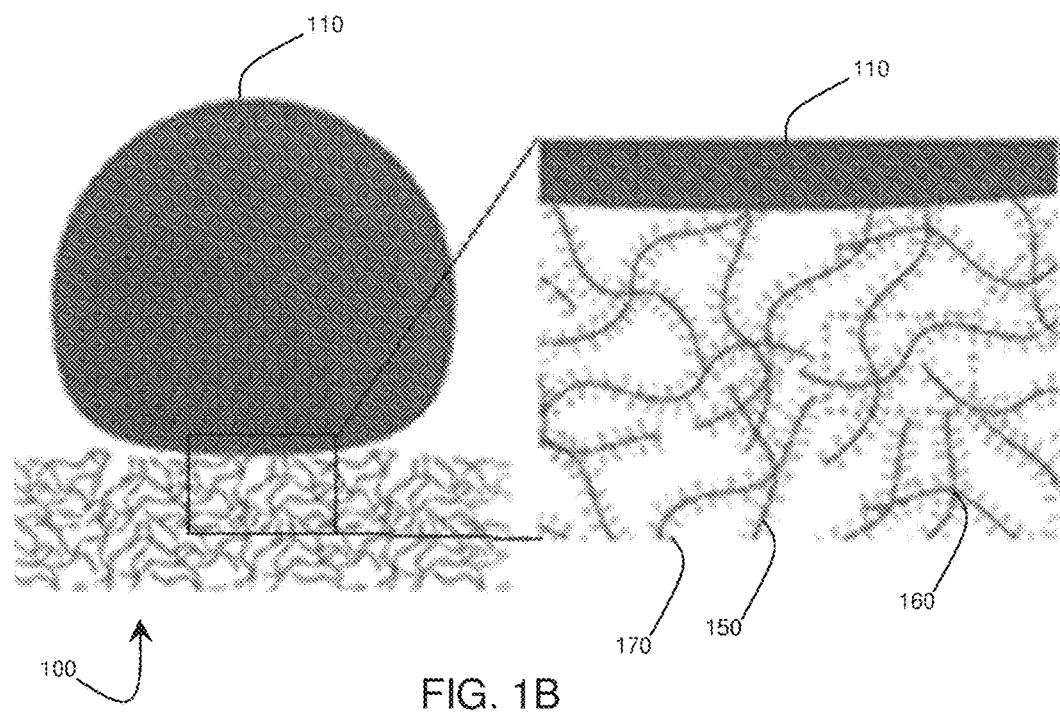
FIG. 1B shows a non-limiting schematic view of the crosslinked polymer matrix comprising pendant groups in FIG. 1A resisting a droplet, according to one set of embodiments.

In certain embodiments, at least some of the pendant groups may impart fluid (e.g., water) resistance to the crosslinked polymer matrix. A non-limiting example of the crosslinked polymer matrix of FIG. 1A resisting a droplet is shown in FIG. 1B. In some embodiments, crosslinked polymer matrix 100 comprising pendant groups 170 can resist droplet 110. In certain embodiments, droplet 110 may be any of a variety of suitable fluids (e.g., liquids). For example, according to certain embodiments, droplet 110 may be water, oil, an aqueous solution (e.g., salt water, soy sauce), acid (e.g., HCl), base (e.g., NaOH), etc. In some embodiments, crosslinked polymer matrix 100 comprising pendant groups 170 may resist droplet 110 at least in part due to the fluorinated nature of pendant groups 170. In some embodiments, at least a portion of pendant groups 170 may have a surface tension that is lower than the surface tension of droplet 110 (e.g., water). In some embodiments, when a coating of crosslinked polymer matrix 100 is applied to a substrate, the substrate has a lower surface tension than droplet 110, at least in part due to the fluorinated nature of pendant groups 170. Accordingly, in some embodiments, the substrate comprising a coating of the crosslinked polymer matrix is able to resist a droplet such that the coating of the crosslinked polymer matrix has a higher fluid (e.g., water, oil) contact angle and a lower fluid (e.g., water, oil) contact angle hysteresis as compared to a substrate that does not comprise the coating of the crosslinked polymer matrix.

Figure 1C:
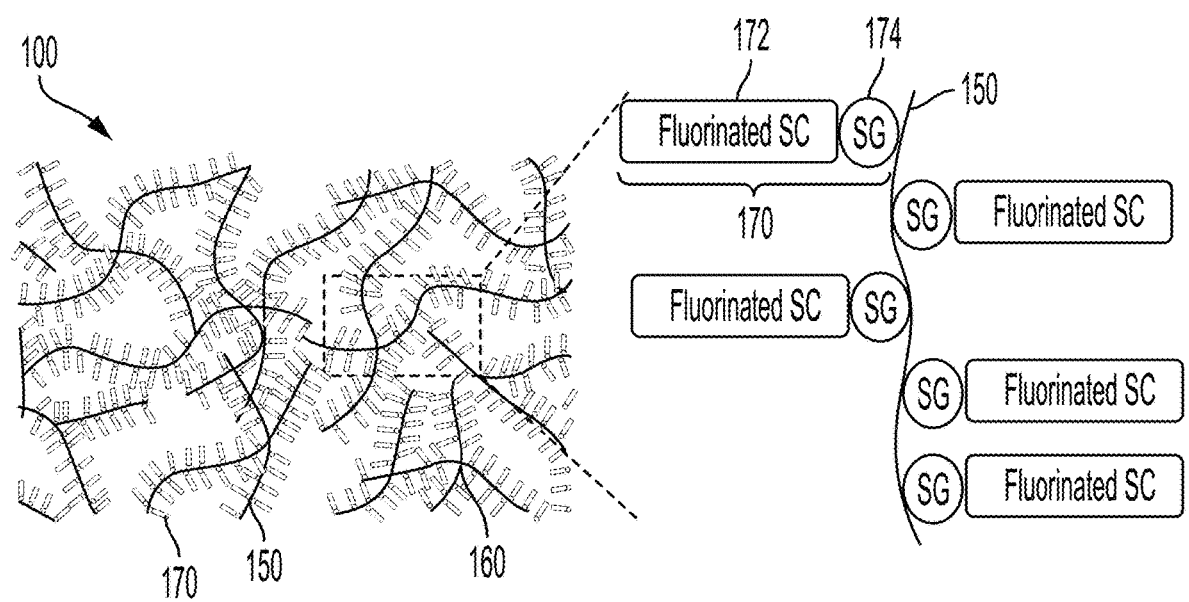
FIG. 1C shows a non-limiting magnified schematic view of the crosslinked polymer matrix comprising pendant groups in FIG. 1A, according to one set of embodiments.

In some embodiments, at least some of the pendant groups may comprise short chain fluoroalkyl groups (e.g, $C_1$-$C_7$ fluoroalkyl groups, $C_1$-$C_7$ perfluoroalkyl groups). For example, in certain embodiments, one or more pendant groups may comprise $C_7$ fluoroalkyl groups. In some embodiments, the fluoroalkyl groups may be directly attached to the polymer backbone. In other embodiments, the fluoroalkyl groups may be attached via a spacer group. A non-limiting example of a magnified schematic view of the crosslinked polymer matrix of FIG. 1A is shown in FIG. 1C. In some embodiments, pendant group 170 comprises short chain fluoroalkyl group 172. In certain embodiments, at least some of short chain fluoroalkyl groups 172 may be responsible for the water resistance of crosslinked polymer matrix 100. The length of the short chain (e.g. $C_1$-$C_7$) fluoroalkyl groups 172 may affect the rigidity and/or crystallinity of crosslinked polymer matrix 100, according to certain embodiments. In some embodiments, pendant groups 170 may comprise spacer group 174. In certain embodiments, at least a portion of spacer groups 174 may serve to increase the rigidity and/or crystallinity of crosslinked polymer matrix 100 as compared to a crosslinked polymer matrix comprising pendant groups without the spacer groups.

In certain embodiments, the pendant groups comprise a $C_1$-$C_7$ fluoroalkyl group. For example, in some embodiments, the pendant groups may comprise a chain of fluorinated carbons between one carbon and seven carbons in length, wherein the carbons are at least partially fluorinated. In certain embodiments, the pendant groups comprise a $C_1$-$C_5$ fluoroalkyl group. In some embodiments, the $C_1$-$C_7$ fluoroalkyl group is not a $C_6$ fluoroalkyl group. For example, according to some embodiments, the fluoroalkyl group is a $C_1$ fluoroalkyl group, a $C_2$ fluoroalkyl group, a $C_3$ fluoroalkyl group, a $C_4$ fluoroalkyl group, a $C_5$ fluoroalkyl group, or a $C_7$ fluoroalkyl group. In reference to FIG. 1C, and according to certain embodiments, fluoroalkyl group 172 may be attached directly to polymer backbones 150 of crosslinked polymer matrix 100. In other embodiments, fluoroalkyl group 172 may be attached to polymer backbones 150 of crosslinked polymer matrix 100 through spacer group 174 In some embodiments, fluoroalkyl group 172 imparts water resistance to crosslinked polymer matrix 100. In certain embodiments, the length of fluoroalkyl group 172 may also affect the rigidity and/or crystallization of pendant groups 170, such that longer (e.g., $C_7$ fluoroalkyl groups) are more easily crystallized as compared to shorter (e.g., $C_1$ fluoroalkyl groups). Longer fluoroalkyl groups 172, and therefore more rigid and/or crystallized pendant groups 170, may lead to less reorientation of the pendant groups upon interaction with fluids, as compared to pendant groups without long fluoroalkyl groups. Increasing the rigidity and/or crystallization of the pendant groups also increases the durability of a coating of the crosslinked polymer matrix, according to certain embodiments.

As used herein, "fluoroalkyl" is a substituted alkyl group wherein one or more of the hydrogen atoms are independently replaced by a fluorine. "Perfluoroalkyl" is a subset of fluoroalkyl, and refers to an alkyl group wherein all of the hydrogen atoms are independently replaced by fluorine. In some embodiments, the fluoroalkyl moiety has 1 to 8 carbon atoms ("$C_{1-8}$ fluoroalkyl"). In some embodiments, the fluoroalkyl moiety has 1 to 6 carbon atoms ("$C_{1-6}$ fluoroalkyl"). In some embodiments, the fluoroalkyl moiety has 1 to 5 carbon atoms ("$C_{1-5}$ fluoroalkyl"). In some embodiments, the fluoroalkyl moiety has 1 to 4 carbon atoms ("$C_{1-4}$ fluoroalkyl"). In some embodiments, the fluoroalkyl moiety has 1 to 3 carbon atoms ("$C_{1-3}$ fluoroalkyl"). In some embodiments, the fluoroalkyl moiety has 1 to 2 carbon atoms ("$C_{1-2}$ fluoroalkyl"). Examples of fluoroalkyl groups include —$CF_3$, —$CF_2CF_3$, —$CF_2CF_2CF_3$, and the like.

In some embodiments, the pendant group comprises a perfluorinated group (e.g, a perfluoroalkyl group). For example, in some embodiments, the pendant group comprises a perfluorinated $C_1$-$C_7$ group (e.g., the pendant group comprises a $C_7$ perfluoroalkyl group). The pendant group may comprise, according to some embodiments, a perfluorinated $C_1$-$C_5$ group (e.g., a $C_1$-$C_5$ perfluoroalkyl group).

In certain embodiments, in addition to the fluoroalkyl group, the pendant groups may comprise a spacer group. In some embodiments, the spacer group is the chemical moiety between the polymer backbone and the fluoroalkyl group. In certain embodiments, the spacer group may comprise an ester group. In some embodiments, the spacer group comprises a methylene group. For example, in a non-limiting embodiment, the spacer group comprises a —C(O)—O—CH$_2$— group. In reference to FIG. 1C, and according to certain embodiments, the length and/or bulkiness of the spacer group 174 may affect the rigidity and/or crystallization of pendant group 170. For example, a spacer group 174 of suitable length may increase the rigidity and/or crystallization of pendant group 170, allowing for less reorientation of the pendant groups upon interaction with fluids, as compared to pendant groups without a spacer group. In some embodiments, spacer group 174 may be directly attached (e.g., bonded) to the fluoroalkyl group 172. In some embodiments, the methylene group of the spacer group may be directly attached to fluoroalkyl group. In certain embodiments, spacer group 174 may be directly attached to polymer backbones 150. For example, in a non-limiting embodiment, a spacer group comprises a —C(O)—O—CH$_2$— group and is directly attached the polymer backbone via the ester terminus, while the methylene terminus is directly attached to the fluoroalkyl group.

In certain embodiments, the spacer group may have a relatively short length. For example, in some embodiments, the spacer group has a length of less than or equal to 6.0 angstroms. In certain embodiments, the spacer group has a length of less than or equal to 5.5 angstroms, less than or equal to 5.0 angstroms, less than or equal to 4.5 angstroms, less than or equal to 4.0 angstroms, less than or equal to 3.5 angstroms, less than or equal to 3.0 angstroms, or less than or equal to 2.5 angstroms. In some embodiments, the spacer group has a length of greater than or equal to 2.0 angstroms, greater than or equal to 2.5 angstroms, greater than or equal to 3.0 angstroms, greater than or equal to 3.5 angstroms, greater than or equal to 4.0 angstroms, greater than or equal to 4.5 angstroms, greater than or equal to 5.0 angstroms, or greater than or equal to 5.5 angstroms. Combinations of the above recited ranges are also possible (e.g., the spacer group has a length of less than or equal to 6.0 angstroms and greater than or equal to 2.0 angstroms, the spacer group has a length of less than or equal to 5.0 angstroms and greater than or equal to 4.5 angstroms).

In some embodiments, the spacer group may comprise any suitable number of carbon atoms (e.g., one carbon, two carbons, three carbons, four carbons, five carbons, etc.) to achieve the desired length. The number of carbons, in certain embodiments, may affect the length and/or bulkiness of the spacer group. In certain embodiments, the spacer group may comprise any of a variety of suitable hydrogenated carbons (e.g., CH$_x$ groups). In some embodiments, the spacer group may comprise one CH$_x$ group, two CH$_x$ groups, three CH$_x$ groups, four CH$_x$ groups, five CH$_x$ groups, etc. For example, in certain non-limiting embodiments, the spacer group may comprise a —(CH$_3$)$_2$C—C(O)—O—CH$_2$— group, —(CH$_2$)C—C(O)—O—CH$_2$— group, a —(CH$_3$)$_2$C—(CH$_3$)$_2$C—C(O)—O—CH$_2$— group, a —(CH$_2$)C—(CH$_3$)$_2$C—C(O)—O—CH$_2$— group, a —(CH$_3$)$_2$C—(CH$_2$)C—C(O)—O—CH$_2$— group, a —(CH$_2$)C—(CH$_2$)C—C(O)—O—CH$_2$— group, etc. Further examples of spacer groups are explained herein.

According to certain embodiments, the crosslinked polymer matrix may comprise any weight percentage of pendant groups. For example, in certain embodiments, the crosslinked polymer matrix comprises pendant groups in an amount between 40 wt. % and 70 wt. %. According to some embodiments, the crosslinked polymer matrix comprises pendant groups in an amount of greater than or equal to 40 wt. %, greater than or equal to 45 wt. %, greater than or equal to 50 wt. %, greater than or equal to 55 wt. %, greater than or equal to 60 wt. %, or greater than or equal to 65 wt. %. In certain embodiments, the crosslinked polymer matrix comprises pendant groups in an amount of less than or equal to 70 wt. %, less than or equal to 65 wt. %, less than or equal to 60 wt. %, less than or equal to 55 wt. %, less than or equal to 50 wt. %, or less than or equal to 45 wt. %. Combinations of the above cited ranged are also possible (e.g., the crosslinked polymer matrix comprises pendant groups in an amount of greater than or equal to 40 wt. % and less than or equal to 70 wt. %, the crosslinked polymer matrix comprises pendant groups in an amount of greater than or equal to 55 wt. % and less than or equal to 60 wt. %). Any suitable method may be used to determine the relative amount of pendant group in the crosslinked polymer matrix including Fourier-transform infrared (FTIR) spectroscopy, multinuclear nuclear magnetic resonance (NMR) spectroscopy (e.g., $^1$H-NMR, $^{13}$C-NMR, and/or $^{19}$F-NMR), and/or X-ray photoelectron spectroscopy). Additionally, in some embodiments, the relative amount of pendant groups in the crosslinked polymer matrix can be calculated stoichiometrically from the initial composition and/or amounts of starting materials (e.g., monomers).

In certain embodiments, the crosslinked polymer matrix is crosslinked with a crosslinking agent. In some embodiments, the crosslinking agent may crosslink one or more polymer backbones together. For example, in certain embodiments, the crosslinking agent may covalently bond one or more polymer backbones together. In reference to FIG. 1A, for example, crosslinking agents cause crosslinks 160 between polymer backbones 150. The crosslinking agent may, according to some embodiments, reduce the mobility of the pendant groups. In certain embodiments, the crosslinking agent may be an ethylene glycol di(meth)acrylate, a methylenebisacrylamide, a formaldehyde-free crosslinking agent, and/or derivatives thereof. In some embodiments, the crosslinking agent may be divinylbenzene, parylene, and/or styrene.

In certain embodiments, the crosslinked polymer matrix may comprise any of a variety of suitable amounts by weight of crosslinking agent. For example, according to some embodiments, the crosslinked polymer matrix comprises crosslinking agent in an amount between 5 wt. % and 70 wt. %. In some embodiments, the crosslinked polymer matrix comprises crosslinking agent in an amount of greater than or equal to 5 wt. %, greater than or equal to 10 wt. %, greater than or equal to 20 wt. %, greater than or equal to 30 wt. %, greater than or equal to 40 wt. %, greater than or equal to 50 wt. %, or greater than or equal to 60 wt. %. In some embodiments, the crosslinked polymer matrix comprises crosslinking agent in an amount of less than or equal to 70 wt. %, less than or equal to 60 wt. %, less than or equal to 50 wt. %, less than or equal to 40 wt. %, less than or equal to 30 wt. %, less than or equal to 20 wt. %, or less than or equal to 10 wt. %. Combinations of the above cited ranges are also possible (e.g., the crosslinked polymer matrix comprises crosslinking agent in an amount of greater than or equal to 30 wt. % and less than or equal to 60 wt. %, the crosslinked polymer matrix comprises crosslinking agent in an amount of greater than or equal to 40 wt. % and less than or equal to 50 wt. %). Any suitable method may be used to determine the relative amount of crosslinking agent in the crosslinked polymer matrix including FTIR spectroscopy, multinuclear NMR spectroscopy (e.g., $^1$H, $^{13}$C), and/or X-ray photoelectron spectroscopy. Additionally, in certain embodiments, the relative amount of crosslinking agent in the crosslinked polymer matrix can be calculated stoichiometrically from the initial composition and/or amounts of starting materials (e.g., monomers).

In certain embodiments, the crosslinked polymer matrix may be positioned on substrate. For example, in some embodiments, the crosslinked polymer matrix may be deposited onto a substrate (e.g., by iCVD) to form a coating of the crosslinked polymer matrix on a substrate. In some embodiments, a substrate to be coated may be positioned in a reaction chamber. In certain embodiments, the iCVD reaction chamber comprises a substrate, an electrode, a filament, and an inlet. In some aspects, the chamber includes a plurality of filaments. In some embodiments, the filaments may be heated (e.g., one or more resistively-heated conducting filaments). The filaments may comprise a metal or other suitable material known in the art. In some embodiments, the filaments may have a diameter of about 0.01 cm to about 0.1 cm. The filaments may be periodically spaced from the substrate and/or from one another, according to certain embodiments. For example, the filaments may be spaced from about 1 mm apart to about 30 mm apart, or from about 0.1 cm to about 20 cm, from the substrate. In some embodiments, the filament may be at a temperature that is less than about 800° C. The substrate may be maintained at a temperature that is substantially lower than that of the heated filaments, according to some embodiments.

The reaction chamber may further include a source of a monomer species in fluid communication with the reaction chamber, a source of an initiator species in fluid communication with the reaction chamber, a vacuum source operably connected to the reaction chamber, and a heat source and/or a cooling source, the heat source and/or the cooling source operably connected to the substrate. The reaction chamber may also include controls for controlling the flow of the monomer species and initiator species. In some cases, the reaction chamber may include a window, a door, or a lid, and/or the chamber may be substantially cylindrical in shape. The reaction chamber may be fabricated from various materials, including glass or stainless steel. Those of ordinary skill in the art would be capable of selecting the appropriate materials for fabricating a reactor as described herein.

In certain embodiments, a method may comprise vaporizing at least two gaseous phase monomers (e.g., precursor monomers). For example, in some embodiments, the method may comprise vaporizing a first monomer and vaporizing a second monomer comprising a $C_1$-$C_7$ fluoroalkyl group. In certain embodiments, the first monomer may be the crosslinking agent (e.g., divinylbenzene). In some embodiments, the second monomer may be a monomer comprising the pendant group. In certain embodiments, the first monomer and/or the second monomer may have low vapor pressure (e.g., 0.1 torr). In some embodiments, the precursor monomers may be vaporized by reducing the pressure of the precursor monomers, instead of, or in addition to, heating the precursor monomers. In certain embodiments, bubbles can be used to increase the injection flow rate of the two precursor monomers into the reaction chamber. In certain embodiments, the method may comprise vaporizing more than two precursor monomers. For example, in a non-limiting embodiment, the method may comprise vaporizing a first monomer that may be a crosslinking agent (e.g., divinylbenzene), a second monomer comprising the pendant group, and a third precursor monomer that is an additional crosslinking agent (e.g., parylene). In some embodiments, the method may comprise vaporizing one crosslinking agent and two different precursor monomers comprising pendant groups.

In some embodiments, the vaporizing of the first monomer and the second monomer is performed in the presence of a free-radical initiator. In certain embodiments, the free-radical initiator may be a thermally labile initiator, which vaporizes and flows into the reaction chamber in addition to the precursor monomers. In some embodiments, upon vaporization of the initiator, thermal energy from the heated filaments may generate initiator radicals. In certain embodiments, the initiator increases the rate of the crosslinking reaction between the first precursor monomer with the second precursor monomer.

In certain embodiments, upon vaporizing the first monomer and second monomer, the first monomer and the second monomer may deposit onto the relatively colder surface of the substrate. For example, in certain embodiments, the substrate may be maintained at a temperature that is less than 175° C. In some embodiments, upon depositing onto the substrate, the first monomer may polymerize with the second monomer (e.g., by free-radical polymerization) to form the crosslinked polymer matrix. For example, according to certain embodiments, the initiator radicals may react with the first monomer and the second monomer adsorbed on the cool surface, polymerizing crosslinkable groups, and forming the crosslinked polymer matrix.

The methods described herein (e.g., the methods of iCVD) may advantageously be carried out at relatively low temperatures (e.g., less than 100° C.). In some embodiments, exposure of the surface to an initiator and/or a monomer may be performed at a temperature of about 100° C. or less, about 90° C. or less, about 80° C. or less, about 70° C. or less, about 60° C. or less, about 50° C. or less, about 40° C. or less, about 30° C. or less, about 20° C. or less, or about 10° C. In some embodiments, the surface is exposed to a initiator and/or a monomer at a temperature in the range of about 5° C. to about 100° C., about 10° C. to about 90° C., about 20° C. to about 80° C., about 30° C. to about 70° C., or about 40° C. to about 60° C. In a particular embodiment, the surface is exposed to a initiator and/or a monomer at a temperature of about 25° C. (e.g., room temperature).

In certain embodiments, upon being deposited on a substrate, the crosslinked polymer matrix may be covalently bound to the substrate. In some embodiments wherein the crosslinked polymer matrix is covalently bound to the substrate, the crosslinked polymer matrix is more durable as compared to a crosslinked polymer matrix that is non-covalently bound to a substrate. For example, in certain embodiments, a crosslinked polymer matrix that is covalently bound to a substrate may be less susceptible to delamination as compared to a crosslinked polymer matrix that is non-covalently bound to a substrate. In certain embodiments, the chemical structure of the substrate may allow for chemical grafting between the crosslinked polymer matrix and the substrate. In certain embodiments, the crosslinked polymer matrix may be chemically grafted onto a substrate containing hydroxyl groups (e.g., nylon fabric) by H-atom abstraction. In certain embodiments, the substrate (e.g., polyester fabric) can be plasma activated and textured with oxygen or argon plasma in order to provide a substrate suitable for chemical grafting.

In some embodiments, the crosslinked polymer matrix may be noncovalently bound to the substrate. For example, in some embodiments, the crosslinked polymer matrix may be bound to the substrate by ionic bonding, H-bonding, Van der Waals forces (e.g., dipole-dipole interactions, dipole-induced dipole interactions, induced dipole-induced dipole interactions, and/or London dispersion forces), and/or n-effects (e.g., n-n interactions).

In some embodiments, layers of the crosslinked polymer matrix can be stacked (e.g. on a substrate). For example, according to certain embodiments, a first layer (e.g., base layer) of the crosslinked polymer matrix may be deposited on the substrate with adhesion to the substrate (e.g., by covalent bonds). In certain embodiments, a second layer of the crosslinked polymer matrix may be deposited onto the first layer of the crosslinked polymer matrix. In some embodiments, the second layer of the crosslinked polymer matrix may coat the first layer of the crosslinked polymer matrix. In certain embodiments, the second layer of the crosslinked polymer matrix may covalently bond to the first layer of the crosslinked polymer matrix. In other embodiments, the second layer of the crosslinked polymer matrix may noncovalently bond to the first layer of the crosslinked polymer matrix. The stacking of layers of the crosslinked polymer matrix may be particularly useful, according to some embodiments, to provide a first layer (e.g., base layer) that is chemically grafted to the substrate (e.g., by covalent bonds) and a second layer that provides the desired chemical properties (e.g., rigidity and/or crystallinity, increased fluid resistance, etc.).

In certain embodiments, the first layer and the second layer may have the substantially the same chemical composition. For example, the coating of the crosslinked polymer matrix may comprise multiple layers of substantially the same chemical composition that are deposited by iCVD in a step-wise fashion. In other embodiments, the first layer and the second layer may have a different chemical composition. For example, the coating of the crosslinked polymer matrix may comprise a first layer with a first chemical composition and a second layer with a second chemical composition that is different from the first chemical composition. In some such embodiments, the first layer may be deposited on the substrate by a first iCVD process, and the second layer is additionally deposited on the first layer be a second iCVD process. In some embodiments, the crosslinked polymer matrix may comprise more than two layers (e.g., three layers, four layers, five layers, etc.). The third layer, fourth layer, fifth layer, etc., may have substantially the same chemical composition, or a different chemical composition, than the first layer and/or second layer.

In certain embodiments, the crosslinked polymer matrix may be sufficiently durable. The durability of the crosslinked polymer matrix may be attributed to the chemical composition of the pendant groups, which affects the rigidity and/or crystallinity of the crosslinked polymer matrix, according to certain embodiments. In some embodiments, increased rigidity and/or crystallinity of the crosslinked polymer matrix may lead to a decrease in pendant group reorientation upon interaction with fluids, and therefore smaller contact angle hysteresis and less pinning.

In some embodiments, the crosslinked polymer matrix may be able to withstand physical damages, such as abrasion. In certain embodiments, the crosslinked polymer matrix may be able to withstand laundering with wash machine cycles (e.g., cold and/or hot wash machine cycles), such that the crosslinked polymer matrix retains its hydrophobicity and/or fluid resistance after any suitable number of cold wash machine cycles (e.g., 10, 20, 50, 100 cold and/or hot wash machine cycles). In certain embodiments, the crosslinked polymer matrix may be sufficiently durable to exposure to harsh chemicals. For example, the crosslinked polymer matrix may be able to withstand soaking and/or washing with acids (e.g., strong acid, such as HCl) and/or bases (e.g., strong bases, such as NaOH). In addition to resisting water, the crosslinked matrix may resist any of a variety of suitable fluids (e.g., oil, coffee, ketchup, soy sauce, and the like), according to certain embodiments. In some embodiments, the crosslinked polymer matrix may be thermally annealed (e.g., at 80° C.) to improve the durability of the coating.

In some embodiments, in addition to the length and/or bulkiness of the pendant group (e.g., the length and/or bulkiness of the fluoroalkyl group and/or spacer group), the crystallinity of at least a portion of the coating of the crosslinked polymer matrix may be controlled by altering the deposition parameters during iCVD. For example, the crystallinity of at least a portion of the crosslinked polymer matrix may be adjusted at any position within the interface of the coating and the substrate and/or throughout the bulk of the coating on the substrate. In some embodiments, the crosslinked polymer matrix is crystalline at the free surface of the coating (e.g., the portion of the coating that is exposed to the environment and/or may receive fluids).

In certain embodiments, at least a portion of the crosslinked polymer matrix may be amorphous. For example, in certain embodiments wherein the crosslinked polymer matrix comprises multiple layers (e.g., two layers), the first layer of the crosslinked polymer matrix deposited on a substrate may be amorphous, and the second layer of the crosslinked polymer matrix coated on the first layer of the crosslinked polymer matrix may be crystalline. In some such embodiments, an amorphous crosslinked polymer matrix may have better adhesion to the substrate (e.g., by covalent bonds).

In some embodiments, the crosslinked polymer matrix may have a relatively large water contact angle. In certain embodiments, a sufficiently large water contact angle indicates the remarkable water resistance performance of the crosslinked polymer matrix. For example, the crosslinked polymer matrix has a water contact angle of greater than 90°, according to certain embodiments. In some embodiments, the crosslinked polymer matrix has a water contact angle of greater than or equal to 95°, greater than or equal to 100', greater than or equal to 105°, greater than or equal to 110°, greater than or equal to 115°, or greater than or equal to 120°. In certain embodiments, the crosslinked polymer matrix has a water contact angle of less than or equal to 125°, less than or equal to 120°, less than or equal to 115°, less than or equal to 110°, less than or equal to 105°, less than or equal to 100°, or less than or equal to 95°. Combinations of the above cited ranges are also possible (e.g., the crosslinked polymer matrix has a water contact angle of greater than or equal to 95° and less than or equal to 125°, the crosslinked polymer matrix has a water contact angle of greater than or equal to 100° and less than or equal to 110°).

In certain embodiments, the coating of the crosslinked polymer matrix may have a relatively small water contact angle hystereses. For example, according to some embodiments, the crosslinked polymer matrix has a water contact angle hysteresis of 30°. In certain embodiments, the crosslinked polymer matrix has a water contact angle hysteresis of less than or equal to 40°, less than or equal to 35°, less than or equal to 30°, less than or equal to 25°, less than or equal to 20°, less than or equal to 15°, less than or equal to 10°, or less than or equal to 5°. In some embodiments, the crosslinked polymer matrix has a water contact angle hysteresis of greater than or equal to 1°, greater than or equal to 5°, greater than or equal to 10°, greater than or equal to 15°, greater than or equal to 20°, greater than or equal to 25°, greater than or equal to 30°, or greater than or equal to 35°. Combinations of the above cited ranges are also possible (e.g., the crosslinked polymer matrix has a water contact angle hysteresis of greater than or equal to 1° and less than or equal to 40°, the crosslinked polymer matrix has a water contact angle hysteresis of greater than or equal to 25° and less than or equal to 35°).

In some embodiments, the crosslinked polymer matrix may have a relatively large oil contact angle. In some embodiments, a sufficiently large oil contact angle indicates the remarkable oil resistance performance of the crosslinked polymer matrix. For example, the crosslinked polymer matrix has an oil contact angle of greater than 30°. In some embodiments, the crosslinked polymer matrix has an oil contact angle of greater than or equal to 40°, greater than or equal to 50°, greater than or equal to 60°, greater than or equal to 70°, greater than or equal to 80°, greater than or equal to 90°, or greater than or equal to 100°. In some embodiments, the crosslinked polymer matrix has an oil contact angle of less than or equal to 125°, less than or equal to 100°, less than or equal to 90°, less than or equal to 80°, less than or equal to 70°, less than or equal to 60°, less than or equal to 50°, or less than or equal to 40°. Combinations of the above cited ranges are also possible (e.g., the crosslinked polymer matrix has an oil contact angle of greater than or equal to 30° and less than or equal to 125°, the crosslinked polymer matrix has an oil contact angle of greater than or equal to 60° and less than or equal to 80°).

In certain embodiments, the coating of the crosslinked polymer matrix may have relatively small oil contact angle hystereses. For example, according to some embodiments, the crosslinked polymer matrix has an oil contact angle hysteresis of 30°. In certain embodiments, the crosslinked polymer matrix has an oil contact angle hysteresis of less than or equal to 50°, less than or equal to 45°, less than or equal to 40°, less than or equal to 35°, less than or equal to 30°, less than or equal to 25°, less than or equal to 20°, less than or equal to 15°, less than or equal to 10°, or less than or equal to 5°. In some embodiments, the crosslinked polymer matrix has an oil contact angle hysteresis of greater than or equal to 1°, greater than or equal to 5°, greater than or equal to 10°, greater than or equal to 15°, greater than or equal to 20°, greater than or equal to 25°, greater than or equal to 30°, greater than or equal to 35°, greater than or equal to 40°, or greater than or equal to 45°. Combinations of the above cited ranges are also possible (e.g., the crosslinked polymer matrix has an oil contact angle hysteresis of greater than or equal to 1° and less than or equal to 50°, the crosslinked polymer matrix has an oil contact angle hysteresis of greater than or equal to 25° and less than or equal to 35°).

In certain embodiments, the iCVD methods described herein allow the thickness of the crosslinked polymer matrix to be advantageously controlled. Accordingly, in some embodiments, the iCVD methods herein produce less waste than conventional methods (e.g., liquid phase deposition) wherein the thickness of a deposit is not controlled. In some embodiments, the crosslinked polymer matrix may be sufficiently thick to ensure that there are no regions of exposed substrate (e.g., the substrate is completely covered by the crosslinked polymer matrix). In certain embodiments, the crosslinked polymer matrix is sufficiently thin enough to avoid clogging of one or more pores of the substrate. Accordingly, in certain embodiments, after deposition of the crosslinked polymer matrix, the breathability of the substrate (e.g., fabric) may be maintained. For example, the initial breathability of the substrate without the crosslinked polymer matrix may change by less than 2.0%, less than 1.5%, less than 1.0%, or less than 0.5% after the crosslinked polymer matrix is deposited on the substrate. In certain embodiments, the crosslinked polymer matrix may have uniform thickness. In some embodiments, the crosslinked polymer matrix may have a non-uniform thickness. The thickness of the coating of the crosslinked polymer matrix, according to certain embodiments, may be controlled by laser interferometry.

In certain embodiments, the crosslinked polymer matrix may have a relatively thin thicknesses. For example, the crosslinked polymer matrix may have a thickness of at least 5 nm, in certain embodiments. In some embodiments, the crosslinked polymer matrix has a thickness of greater than or equal to 5 nm, greater than or equal to 10 nm, greater than or equal to 15 nm, greater than or equal to 20 nm, greater than or equal to 30 nm, greater than or equal to 40 nm, greater than or equal to 50 nm, greater than or equal to 75 nm, greater than or equal to 100 nm, or greater than or equal to 150 nm. In certain embodiments, the crosslinked polymer matrix has a thickness of less than or equal to 200 nm, less than or equal to 150 nm, less than or equal to 100 nm, less than or equal to 50 nm, less than or equal to 40 nm, less than or equal to 30 nm, less than or equal to 20 nm, less than or equal to 15 nm, or less than or equal to 10 nm. Combinations of the above recited ranges are also possible (e.g., the crosslinked polymer matrix has a thickness of greater than or equal to 5 nm and less than or equal to 200 nm, the crosslinked polymer matrix has a thickness of greater than or equal to 30 nm and less than or equal to 100 nm).

In addition to the thickness of the crosslinked polymer matrix, the shape and/or size of the crosslinked polymer matrix may also be precisely tuned by the method of iCVD. For example, in certain embodiments, it may be particularly useful to coat only a portion of a substrate (e.g., clothing fabric) with the crosslinked polymer matrix. Accordingly, in some embodiments, the coating of the crosslinked polymer matrix may have any of a variety of suitable shapes or sizes (e.g., square, circular, triangular, and the like).

In certain embodiments, the crosslinked polymer matrix may be positioned (e.g., deposited) on any of a variety of suitable substrates. For example, according to certain embodiments, the substrate may comprise woven fibers and/or nonwoven fibers. In some embodiments, the substrate is a fabric. The fabrics may have any of a variety of suitable weaves and/or types, according to some embodiments. For example, the fabrics may be duchesse, luxury duchesse, georgette, and/or plain. In some embodiments, the fabric may be any of a variety of suitable materials, including polyester, nylon, cotton, silk, linen, and/or wool. The coatings described herein may be particularly useful for a coating on clothing and/or shoes, according to certain embodiments. In some cases, the substrate may be silicon wafer, paper, and/or a nano-textured surface. In certain embodiments, the substrate may comprise one or more pores.

In certain embodiments, the substrate may be textured prior to deposition of the crosslinked polymer matrix. In certain embodiments, the method of texturing (e.g., sandblasting) results in a tunable coating roughness that further enhances the dynamic water resistance of the deposited copolymer comprising short chain fluorinated pendant groups. The method of sandblasting, in certain embodiments, may result in a substrate and a water resistant coating comprising microscale and/or nanoscale features. In some embodiments, the method related to iCVD and sandblasting provides a durable water-resistant coating that can be applied to a wide range of substrates as diverse as fabrics, paper, and nano-textured silicon.

In accordance with certain embodiments, the substrate may be textured using a variety of suitable methods, including mechanical methods. For example, in some embodiments, the substrate is sandblasted, prior to deposition of the crosslinked polymer matrix, to provide any of a variety of suitable texture features on the surface. In some embodiments, the method of sandblasting may avoid damage of the overall mechanical properties of the substrate in comparison to, for example, chemical methods such as chemical etching. In certain embodiments, the substrate is sandblasted with $Al_2O_3$ particles. The substrate may be sandblasted for any of a variety of suitable durations of time (e.g., 10 seconds) with any of a variety suitably sized particles (e.g., 10 micron sized particles). In some embodiments, the substrate can be textured via lithography. In certain embodiments, the substrate can be textured via self-assembly. In some embodiments, the features can be deposited onto a substrate. In certain embodiments, the substrate can be textured. via laser ablation.

In some embodiments, the substrate comprises microscale and/or nanoscale features after texturing. In certain embodiments, the microscale and/or nanoscale features comprise cavities, grooves, and/or protrusions. In some embodiments, the features comprise protrusions. Non-limiting examples of protrusions include spherical or hemispherical protrusions, such as ridges, pores, spikes, bumps, and posts. In certain embodiments, the microscale and/or nanoscale features may be dispersed on the surface in a random (e.g., fractal) or patterned manner.

In certain embodiments, the substrate can be at least partially made up of microscale features. "Microscale" is used herein in a manner consistent with its ordinary meaning in the art. Microscale features are features having a maximum height of from 1 micrometer to 100 micrometers. According to some embodiments, the maximum height of the microscale features is from 1 micrometer to 10 micrometers, 10 micrometers to 20 micrometers, 20 micrometers to micrometers, 30 micrometers to 50 micrometers, 50 micrometers to 70 micrometers, or 70 micrometers to 100 micrometers. Combinations of the above cited ranges are also possible (e.g., micrometers to 70 micrometers, or 20 micrometers to 100 micrometers).

In certain embodiments, nanoscale features are used. "Nanoscale" is used herein in a manner consistent with its ordinary meaning in the art. Nanoscale features are features from 1 nm to 1 micrometer in maximum height. According to some embodiments, the maximum height of the nanoscale features is from 1 nm to 100 nm, 100 nm to 200 micrometers, 200 um to 300 nm, 300 nm to 500 nm, 500 nm to 700 nm, or 700 nm to 1 micrometer. Combinations of the above cited ranges are also possible (e.g., 300 nm to 700 nm, or 200 nm to 1 micrometer).

In some embodiments, the features (e.g., the microscale and/or nanoscale features) may have any of a variety of suitable characteristic spacings. As used herein, the characteristic spacing of a particular feature refers to the shortest distance between the external surface of the feature and the external surface of that feature's nearest neighbor. For a plurality of features, the average characteristic spacing refers to the number average of the characteristic spacings of the individual features.

In certain embodiments, the average characteristic spacing between the microscale features, when present, is at least 1 micrometer, at least 5 micrometers, at least 10 micrometers, at least 30 micrometers, at least 50 micrometers, or at least 90 micrometers. According to some embodiments, the average characteristic spacing between the microscale features is less than or equal to 500 micrometers, less than or equal to 200 micrometers, less than or equal to 100 micrometers, less than or equal to 90 micrometers, less than or equal to 70 micrometers, less than or equal to 50 micrometers, less than or equal to 30 micrometers, less than or equal to 10 micrometers, or less than or equal to 5 micrometers. Combinations of these ranges are also possible (e.g., from 1 micrometer to 5 micrometers, from 5 micrometers to 10 micrometers, from micrometers to 30 micrometers, from 30 micrometers to 50 micrometers, from 50 micrometers to 70 micrometers, from 70 micrometers to 90 micrometers, or from 90 micrometers to 100 micrometers).

According to some embodiments, the average characteristic spacing between the nanoscale features, when present, is at least 1 nm, at least 10 nm, at least 50 nm, at least 100 nm, at least 200 nm, at least 300 nm, at least 500 nm, or at least 700 nm. According to some embodiments, the average characteristic spacing between the nanoscale features, when present, is less than or equal to 1 micrometer, less than or equal to 700 nm, less than or equal to 500 nm, less than or equal to 300 nm, less than or equal to 200 nm, less than or equal to 100 nm, less than or equal to 50 nm, or less than or equal to 10 nm. Combinations of these ranges are also possible (e.g., from 1 nm to 100 nm, from 100 nm to 200 nm, from 200 nm to 300 nm, from 300 nm to 500 nm, from 500 nm to 700 nm, or from 700 nm to 1 micrometer).

According to certain embodiments, the features may be relatively regularly spaced across the surface. This may be achieved, for example, by spacing the features in a pattern. In some embodiments, the standard deviation of the nearest neighbor distances of the features on the surface is less than 20% (or less than 10%, or less than 5%, or less than 2%, or less than 1%) of the number average of the nearest neighbor distances of the features on the surface. This standard deviation can be determined by determining, for each feature, the nearest neighbor distance and comparing the standard deviation of those nearest neighbor distances to the number average of those nearest neighbor distances.

In certain embodiments, the microscale and/or nanoscale features on the surface of the substrate (e.g., the sandblasted substrate) may have any of a variety of suitable aspect ratios. Those skilled in the art would understand that the aspect ratio of a given feature is measured along the long axis of the feature, and is expressed as the ratio of the length of the long axis of the feature to the maximum cross-sectional diameter of the feature. In some embodiments, the microscale and/or nanoscale features may have an aspect ratio of at least about 1:1, at least about 2:1; at least about 3:1; at least about 4:1; at least about 5:1, at least about 10:1; at least about 20:1, at least about 50:1; at least about 100:1; at least about 500:1; or at least about 1000:1. In certain embodiments, the microscale and/or nanoscale features may have an aspect ratio of less than about 5000:1, less than about 1000:1, less than about 500:1, less than about 100:1, less than about 50:1, less than about 20:1, less than about 10:1, less than about 5:1, less than about 4:1, less than about 3:1, or less than about 2:1. Combinations of the above recited ranges are also possible (e.g., in certain embodiments, the microscale and/or nanoscale features have an aspect ratio of at least about 1:1 and less than about 5000:1, the microscale and/or nanoscale features have an aspect ratio of at least about 10:1 and less than about 100:1).

In certain embodiments, the substrate (e.g., the sandblasted substrate) may comprise any of a variety of Wenzel roughness factors. For example, in certain embodiments, the sandblasted substrate may comprise a Wenzel roughness factor of greater than or equal to 1, greater than or equal to 2, greater than or equal to 3, or greater than or equal to 4. In certain embodiments, the sandblasted substrate may comprise a Wenzel roughness factor of less than or equal to 5, less than or equal to 4, less than or equal to 3, or less than or equal to 2. Combinations of the above recited references are also possible (e.g., the sandblasted substrate may comprise a Wenzel roughness factor of greater than or equal to 1 and less than or equal to 5, the sandblasted substrate may comprise a Wenzel roughness factor or greater than or equal to 2 and less than or equal to 4).

In certain embodiments, the crosslinked polymer matrix may be deposited onto the substrate (e.g., sandblasted substrate) comprising microscale and/or nanoscale features. In some embodiments, the crosslinked polymer matrix may conform to the substrate comprising microscale and/or nanoscale features, such that the crosslinked polymer matrix comprises the microscale and/or nanoscale features of the substrate. In certain embodiments, the textured features on the substrate may further enhance the fluid (e.g., water) resistance of the crosslinked polymer matrix after the crosslinked polymer matrix has been deposited, such that any liquid that comes into contact with the crosslinked polymer matrix deposited on the substrate comprising microscale and/or nanoscale features traverses the microscale and/or nanoscale features. In certain embodiments, the method of texturing the substrate and the method of depositing the coating of the crosslinked polymer matrix by iCVD may be performed in a single step (e.g., at the same time).

Any suitable precursor monomers may employed to provide the crosslinked polymer matrix. For example, in certain embodiments, a precursor monomer may comprise a non-fluorinated portion in addition to the $C_1$-$C_7$ fluoroalkyl group. For example, in some embodiments, the monomer may comprise a linear alkyl acrylate of the form $CH_2=CH-COOR$, wherein R is $C_n-H_{2+1}$ and n=2-20. In certain embodiments, the monomer may comprise a linear alkyl methacrylate of the form $CH_2=C(CH_3)-COOR$, wherein R is $C_n-H_{2+1}$ and n=2-20. In some embodiments, the monomer may comprise an alpha-olefin (e.g., a $C_n-H_{2n}$), wherein the double bond is at the primary of alpha position). Suitable monomers comprising a non-fluorinated portion may comprise poly-tetradecyl acrylate, poly-hexadecyl acrylate, poly-octadecyl acrylate, stearyl acrylate, behenyl acrylate, poly-hexadecyl methacrylate, poly-octadecyl methacrylate, stearyl methacrylate, and/or behenyl methacrylate, tert-butyl methacrylate, isoamyl methacrylate, cyclohexyl methacrylate, cyclohexyl methacrylate, 1-pentene, 1-butene, ethylene, 1-dodecene, 1-tetradecene, 1-hexadecene, 1-octadecene, and/or 1-eicosene. Suitable monomers comprising a non-fluorinated portion in addition to the $C_1$-$C_7$ fluoroalkyl group comprise 2,2,3,3,3-pentafluoropropyl acrylate, 2,2,3,4,4,4-hexafluorobutyl acrylate, heptafluorobutyl acrylate, 2,2,3,3,4,4,5,5-octafluoropentyl acrylate, 1H,1H,2H,2H-perfluorohexyl acrylate, 3,3,4,4,5,5,6,6,7,7,8,8,8-tridecafluorooctly acrylate, 2,2,3,3,4,4,5,5,6,6,7,7-dodecafluoroheptyl acrylate, poly[2-[[[[2-(perfluorohexyl)]-sulfonyl]methyl]-amino[ethyl] acrylate, poly-perfluorodecylacrylate and/or the methacrylate derivatives of the aforementioned compounds.

In certain embodiments, at least one of the precursor monomers may have any of a variety of suitable glass transition temperatures ($T_g$). In certain embodiments, precursor monomers with a high $T_g$ value provide increased crystallinity of the crosslinked polymer matrix upon deposition. In certain embodiments, at least one of the precursor monomers has a $T_g$ of greater than or equal to −80° C., greater than or equal to −60° C., greater than or equal to −40° C., greater than or equal to −20° C., greater than or equal to 0° C., greater than or equal to 20° C., greater than or equal to 40° C., greater than or equal to 50° C., greater than or equal to 60° C., greater than or equal to 70° C., greater than or equal to 80° C., or greater than or equal to 90° C. In some embodiments, at least one of the precursor monomers has a $T_g$ of less than or equal to 100° C., less than or equal to 90° C., less than or equal to 80° C., less than or equal to 70° C., less than or equal to 60° C., less than or equal to 50° C., less than or equal to 40° C., less than or equal to 20° C., less than or equal to 0° C., less than or equal to −20° C., less than or equal to −40° C., or less than or equal to −60° C. Combinations of the above recited ranges are also possible (e.g., at least one of the precursor monomers has a $T_g$ of greater than or equal to −80° C. and less than or equal to 100° C., at least one of the precursor monomers has a $T_g$ of greater than or equal to 40° C. and less than or equal to 80° C.).

In some aspects, the initiator may be a thermal initiator, such as perfluorooctane sulfonyl fluoride, triethylamine, tert-butyl peroxide, tert-butyl peroxybenzoate, tert-amyl peroxide, and the like. In some embodiments, the initiator may be a photoinitiator. For example, the methods may involve introduction (e.g., continuous introduction) of a photoinitiator, such as 2,2'-azobis(2-methylpropane), into a vacuum chamber under UV irradiation or other electromagnetic radiation. In such cases, the vacuum chamber may include, for example, a UV-transparent window instead of or in addition to filaments. In other embodiments, a Type II photoinitiator, such as benzophenone, that can produce free-radical sites on the substrate surface may be employed.

As described herein, the coating may comprise one or more polymers. Polymers are generally extended molecular structures comprising backbones which optionally contain pendant groups, wherein the term backbone is given its ordinary meaning as used in the art, e.g., a linear chain of atoms within the polymer molecule by which other chains may be regarded as being pendant. Typically, but not always, the backbone is the longest chain of atoms within the polymer. A polymer may be a co-polymer, for example, a block, alternating, or random co-polymer. A polymer may also comprise a mixture of polymers. In some embodiments, the polymer may be acyclic or cyclic.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Example 1

The following example describes the fabrication and characterization of a hydrophobic polymer coating synthesized by iCVD.

The iCVD process is a single-step vapor-phase method used to deposit conformal polymer films with a controllable thickness and texture. Additionally, the potential to graft the polymer directly to the substrate enhances coating durability. The side chains of polymer films, grown through radical polymerization, play a key role in the macroscopic properties of the films. The highest hydrophobicity (that is, the lowest surface energy) is chemically achieved with $—CF_3$ groups, followed by $—CF_2H$, $—CF_2$, $—CH_3$, $—CH_2$, in terms of decreasing hydrophobicity, respectively. Crosslinked polymer matrices comprising fluorine pendant groups, as shown in FIG. 1A, lead to surface energies as low as 6 mN m$^{-1}$ when uniformly structured. Since such low surface energies (giving rise to extremely non-wetting substrates) can only be achieved with fluorinated chemistries, traditional and widely used silicon based coatings do not provide suitable replacement solutions. Because the pendant groups can reorient upon interaction with different media, they can lead to increased contact angle hysteresis (CAH). It is therefore important to control fluorine content and minimize the pendant chain reorientation ability.

Figure 2A:
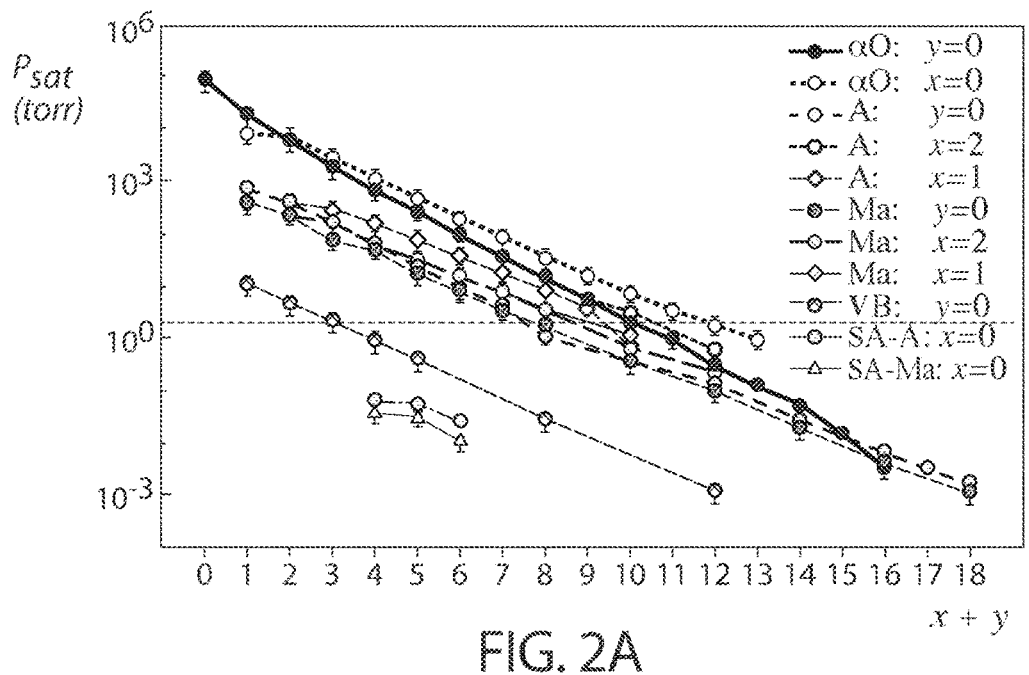
FIG. 2A shows a graph of monomer vapor pressure as a function of pendant group length, according to one set of embodiments.
Figure 2B:
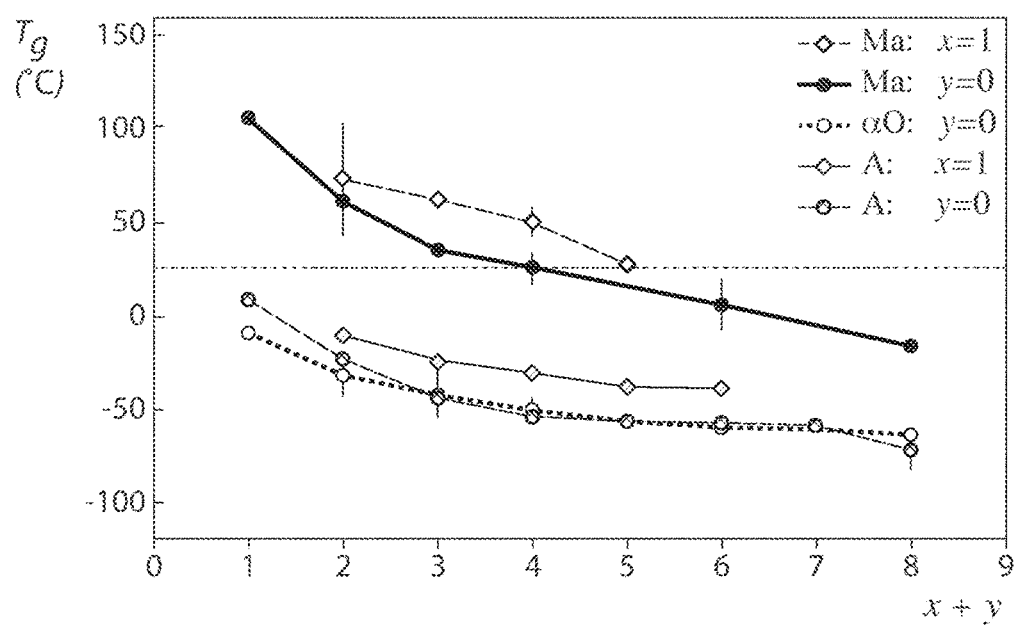
FIG. 2B shows a graph of monomer glass transition temperature as a function of pendant group length, according to one set of embodiments.

For vapor deposition approaches, the consequences of going to short-fluorinated side chain polymers (fewer than 8 fluorinated carbons) are drastic: the polymer will not crystallize and its amorphous nature will lead to increased pendant group mobility. For example, FIG. 2B shows glass transition temperature ($T_g$) as a function of pendant group length x+y, where x is hydrogenated carobs and y is fluorinated carbons: olefins ($\alpha$O); acrylates (A); sulfonamide acrylate (SA-A); methacrylates (MA); sulfonamide methacrylate (SA-M); and vinyl benzene (VB). As shown in FIG. 2B, $T_g$ decreases with increasing spacer length. Considering that fluorine content needs to be kept as high as possible in order to have low surface energies and high contact angles, the best vaporizable monomer candidate with 7 fluorinated carbons was identified, and its pendant group interactions were optimized by tuning the main chain flexibility, the stiffness of the spacer group, and the geometrical hindering of substituents. The fluorinated tails can be attached to a wide range of reactive heads, allowing selection of the most suitable monomers for radical chain polymerization process: including olefins, vinylbenzenes, acrylates, methacrylates, and their derivatives. Among these options, monomers that are able to evaporate into the reactor chamber can be used with iCVD processes (typical vapor pressure above 1 Torr). FIG. 2A shows monomer vapor pressure at 80° C. as a function of pendant group length. It was observed, as shown in FIG. 2A, that although vinylbenzenes (VB), sulfonamide acrylates (SA-A), and sulfonamide methacrylates (SA-M) are good candidates, they have a stiff and bulky spacer group preventing chain mobility and are too heavy to be easily vaporized Stiffer spacer groups (only one $—CH_2—$ group between the head and the fluorinated chain being the stiffest solution), as well as a bulky alpha substituents, will reduce side chain mobility, suggesting 1H,1H-perfluorooctyl methacrylate ($H_1F_7Ma$) as the best candidate. Indeed, this lack of mobility can be also observed in FIG. 2B, in which for a given pendant group length, the highest $T_g$ corresponds to the case of methacrylates.

Figure 3A:
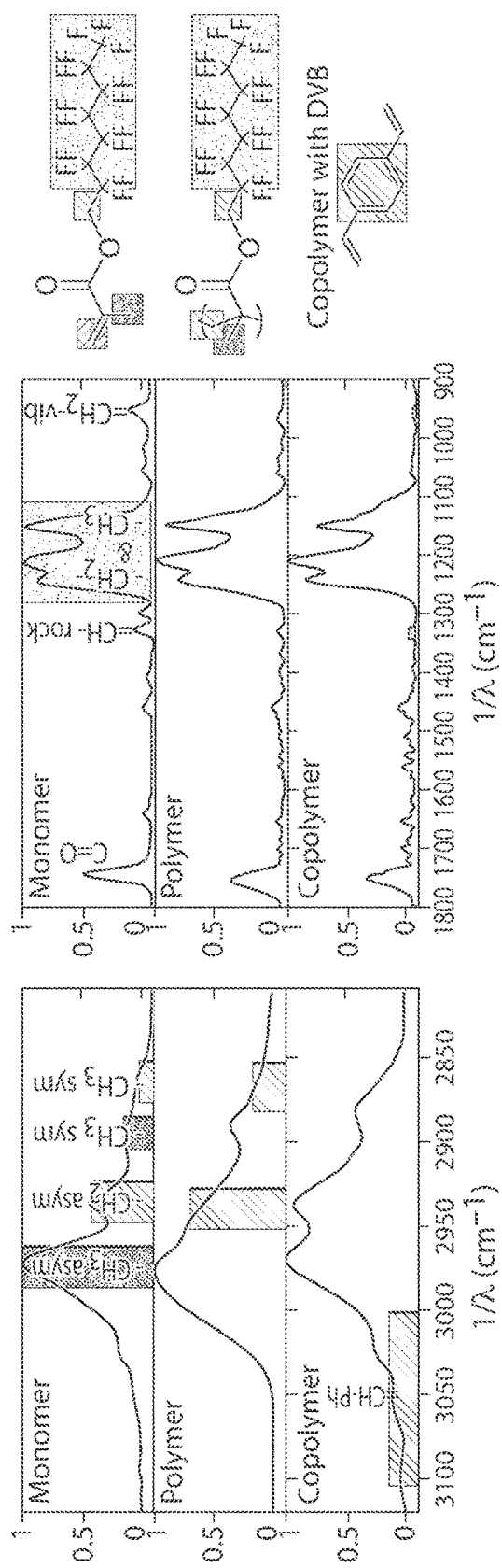
FIG. 3A shows FTIR spectra of $H_1F_7Ma$ monomer (top rows), $H_1F_7Ma$ homopolymer (middle rows) and $H_1F_7Ma$-DVB copolymer (bottom rows), according to one set of embodiments.
Figure 3B:
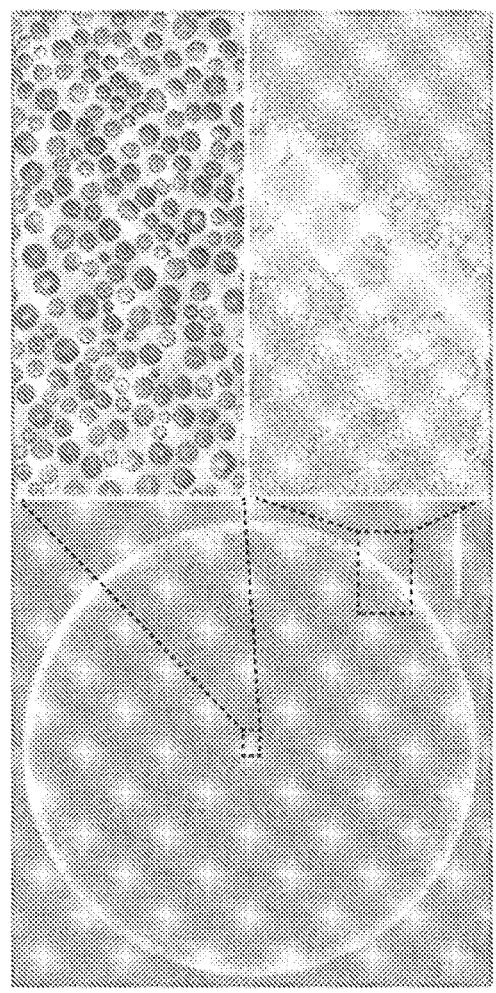
FIG. 3B shows a microscopic top view of a defect left on a substrate coated with homopolymer after water droplet removal, according to one set of embodiments.
Figure 3C:
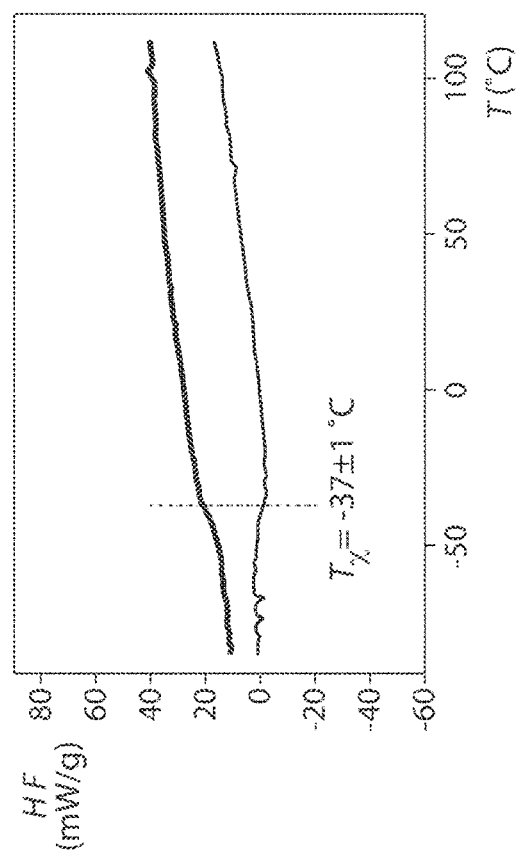
FIG. 3C shows a graph of the heat flux of the $H_1F_7Ma$ homopolymer as a function of temperature, in which the $H_1F_7Ma$ homopolymer has a glass transition temperature of −37° C., according to one set of embodiments.

In order to deposit the homopolymer $H_1F_7Ma$ via iCVD, the monomer was heated at 80° C. and the vapor phase was introduced into a reactor chamber at several hundred millitorr. The gaseous initiator tert-butyl peroxide (TBPO) was activated via heating filaments and polymerization of a film of typical thickness 100 nm was enabled directly onto the surface of a flat silicon substrate or textured (e.g., fabric) substrate. To ensure the successful polymerization, the FTIR spectra of the proposed $H_1F_7Ma$ homopolymer was evaluated and compared to the $H_1F_7Ma$ monomer, as shown in FIG. 3A. Normalizing the 2850-3000 cm$^{-1}$ region by the total intensity of the —$CH_3$ asymmetric vibration peak (region at 2975 cm$^{-1}$, expected to remain unchanged through polymerization) a relative increase of the —$CH_2$— asymmetric peak was observed at 2940 cm$^{-1}$ for the polymer case, confirming the formation of a backbone chain. Similarly, normalizing the region 900-1400 cm$^{-1}$ by the intensity of the bands attributed to the —$CF_2$— and —$CF_3$ moieties (at 1146 and 1240 cm$^{-1}$, respectively, expected also to remain unchanged), a relative decrease of the =CH— rocking and =$CH_2$ vibrational peaks was observed (at 1327 and 950 cm$^{-1}$, respectively), confirming the successful formation of the expected polymer. Although the coating deposited onto a flat silicon surface shows a very good advancing contact angle (close to the theoretical limit of 120°, see FIG. 4A), the receding contact angle is extremely low and the water droplet exhibits considerable pinning. When removing the drop, a visible mark is left behind (see FIG. 3B, wherein the scale car is 0.5 mm), an indication that the coating is not stable. The close-up views in FIG. 3B correspond to selected regions: the top view shows destabilization of the coating into droplets, and the bottom view shows coating droplets displaced at the triple contact line after drop removal. Microscope examination after polymerization shows that the film has destabilized into tiny droplets that can be displaced by the water at the contact line, creating this unusual highly pinning behavior. To further understand this behavior, the glass transition temperature $T_g$ for the homopolymer was measured with differential scanning calorimetry (DSC) and found to be around –37° C. (see FIG. 3C), in agreement with trends shown in FIG. 2B and confirming that the coating was an elastomer allowing the film to destabilize.

Example 2

The following example describes the fabrication and characterization of a hydrophobic copolymer coating synthesized by iCVD.

Figure 4A:
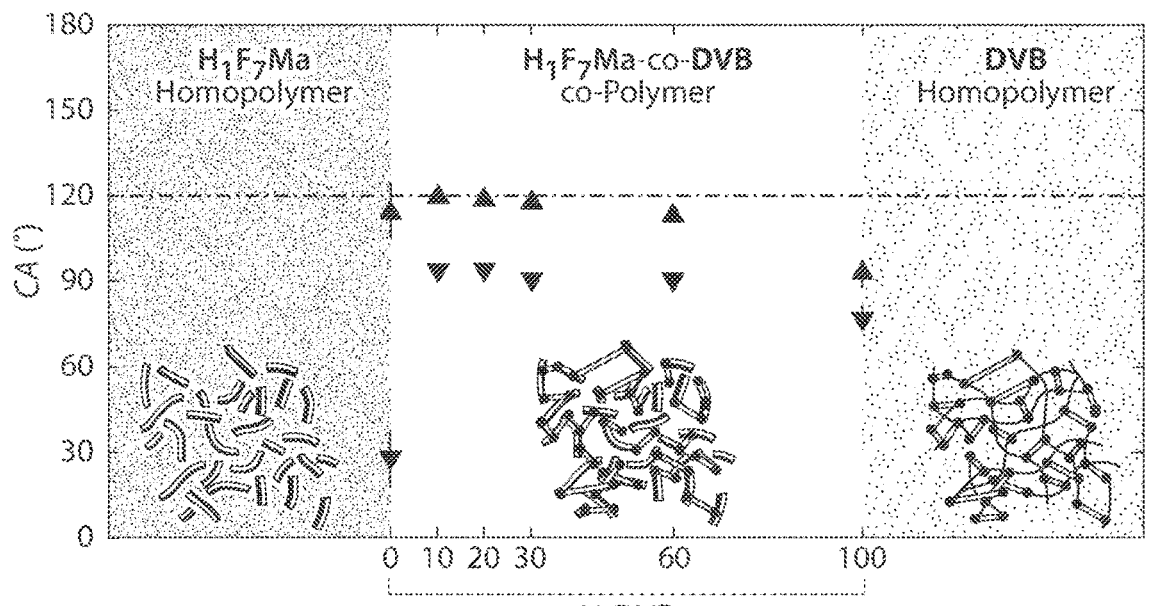
FIG. 4A shows the advancing and receding contact angle (upward and downward triangles, respectively) for water measured on a substrate coated with different $H_1F_7Ma$-DVB copolymers, according to one set of embodiments.

To overcome the limitation of destabilizing films, the compound $H_1F_7Ma$ was crosslinked with divinylbenzene (DVB), and the presence of the crosslinker was verified in the $H_1F_7Ma$-DVB copolymer by the appearance of band around 3050 cm$^{-1}$ (a signature of the benzene=CH bond, see FIG. 3A) in the FTIR spectra. Indeed, when measuring the dynamic contact angle of water across copolymer coatings with different DVB content (FIG. 4A, from 10% to 60% DVB) it was observed that the film was stabilized and retained the high hydrophobicity of the fluorinated $H_1F_7Ma$ homopolymer as well as the low contact angle hysteresis of pure DVB. The chemical schematics in FIG. 4A show how DVB acts as a crosslinker by building bridges between backbones of different polymer chains, and the dashed horizontal line marks the theoretical limit of 120°.

Figure 4B:
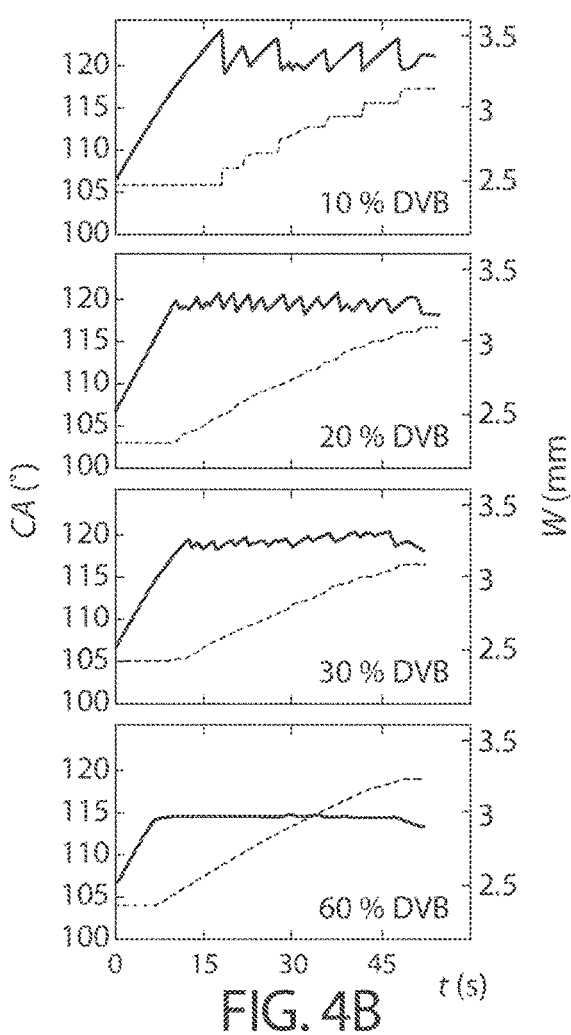
FIG. 4B shows graphs of the contact angle and width of contact area of droplet for a droplet placed on a substrate coated with different $H_1F_7Ma$-DVB copolymers as a function of time, according to certain embodiments.

In order to find the optimal composition of the film, the temporal behavior of the advancing contact angle for the different DVB compositions was investigated, as shown in FIG. 4B. Below a 30 wt. % DVB content, a "stick-slip" behavior can be observed due to the low crosslinking rate of DVB, leading to increased CAH. Above a 60 wt. % DVB content, the "stick-slip" behavior is suppressed, but the overall hydrophobicity starts to decrease because of the lower overall fluorine content. The optimal crosslinker content is found to be between 30 wt. % and 60 wt. % DVB, depending on the application.

Figure 4C:
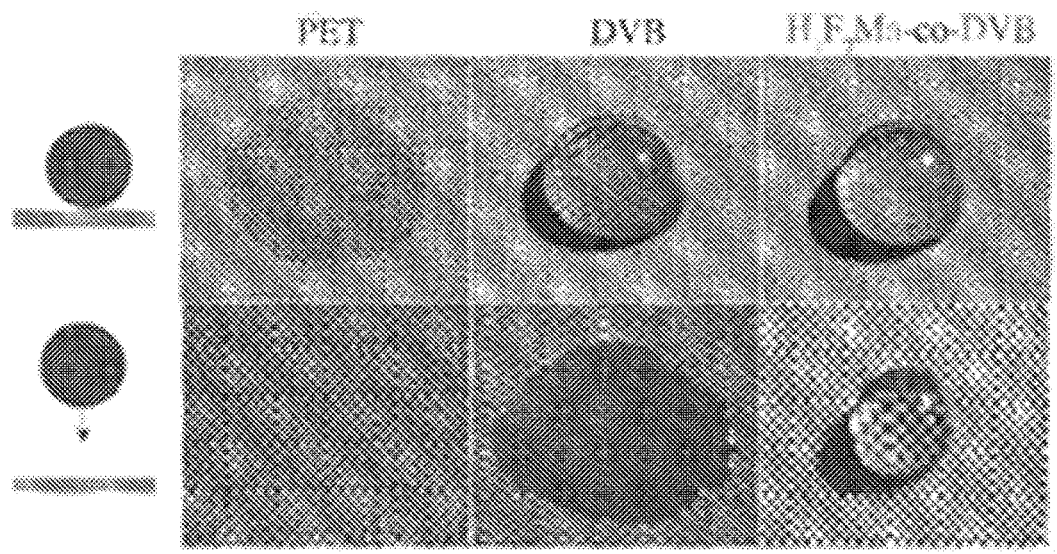
FIG. 4C shows, droplets after being deposited (top row) or impacted (bottom row) against an untreated substrate (left column), a substrate coated with DVB (middle column), and a substrate coated with $H_1F_7$Ma-DVB copolymer (right column), according to certain embodiments.
Figure 4D:
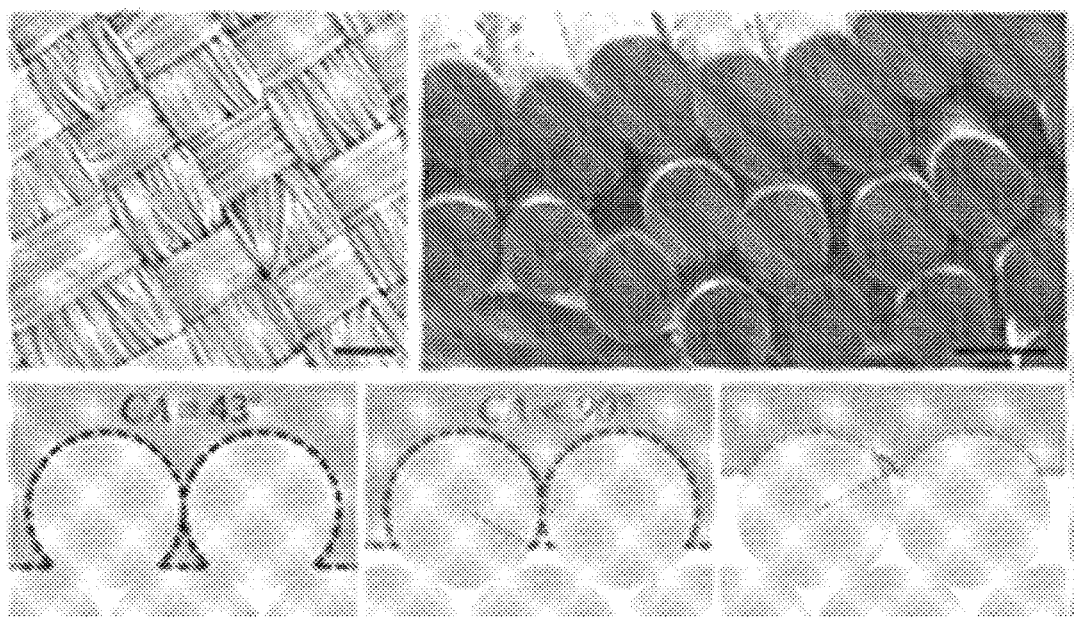
FIG. 4D, shows, a top-view (left) and cross-section (right) scanning electron micrograph (SEM) of a typical outdoor garment fabric, according one set of embodiments.
Figure 5A:
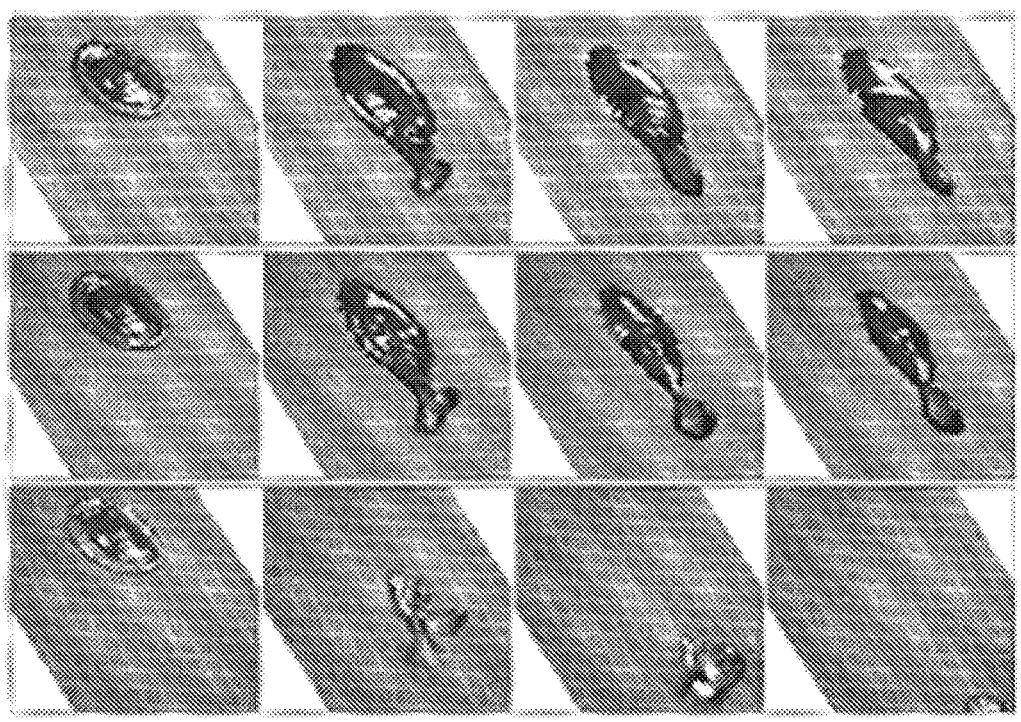
FIG. 5A shows chronophotography of a millimetric water droplet impacting on a 45-degree inclined substrate, according to one set of embodiments.
Figure 5B:
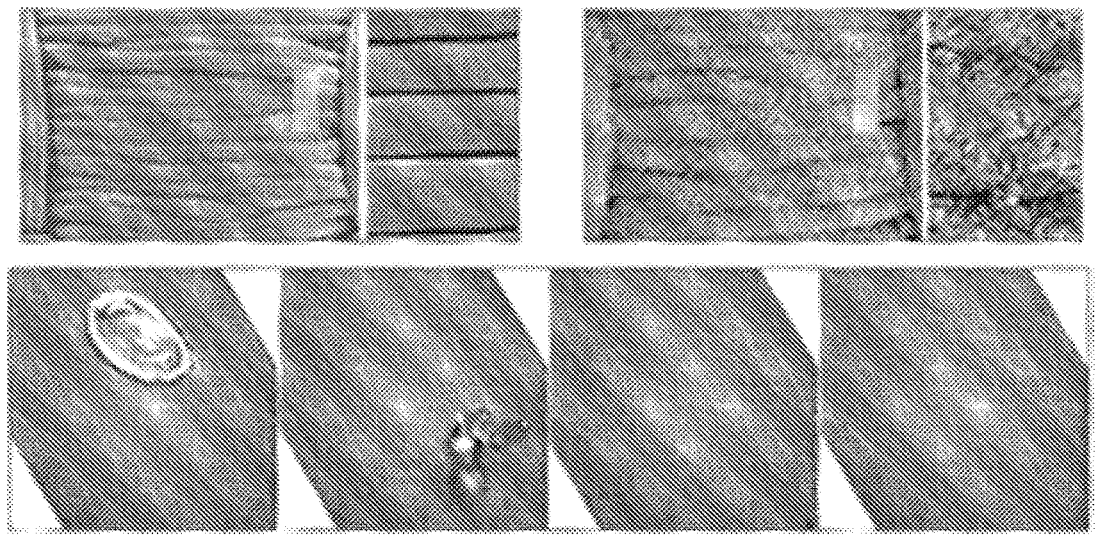
FIG. 5B shows a top-view SEM of a fabric before (top left) and after (top right) sand blasting with $Al_2O_3$ particles of grit #600 (top row), and a chronophotograph of drop impacting on $H_1F_7$Ma-DVB copolymer sandblasted fabric (bottom row), according to one set of embodiments.

Since iCVD coatings can be applied on a wide variety of substrates, different polymer performance was investigated on poly ethylene terephthalate polyester (PET) fabrics (20 denier warp×20 denier fill, taken as a reference since, together with nylon, they represent the two main outdoor fabric materials). As shown in FIG. 4C, without treatment, the hydrophilic nature of PET resulted in immediate water penetration. When coated with a DVB homopolymer (more hydrophobic than PET), water beaded up if deposited gently, but will still soak if impacted. Only the $H_1F_7Ma$-DVB copolymer coating will ensure extended water resistance. The structural nature of textiles created by weaving yarns made of interlocked fibers is shown FIG. 4D, and the interlocked fibers exist in a variety of different patterns is shown in FIG. 5D). By modeling the cross section of fibers as cylinders piled up in planes (typically going from 3 to 10 layers, see FIG. 4D), it was assumed that the condition for water penetration across the textile is for the contact line at a given layer of cylinders to reach the apex of the layer underneath it. In FIG. 4D, the bottom schematic shows an impregnation model across stacked cylinders, wherein the more hydrophobic the chemistry, the more robust will be the fabric regarding water penetration. In this framework, if the equilibrium contact angle is low (e.g., below 43°) the water will spontaneously wick the medium, as seen for nylon and PET. Between 43° and 90°, even if the substrate is hydrophilic, water will not wick spontaneously but small pressure perturbations or texture defects will allow the water to wick from one level to the next, as seen for the pure DVB coatings. Finally, in the hydrophobic case, considering that contact line has to overcome the advancing contact angle in order to infiltrate a layer of fibers, greater contact angles result in increased water resistance. Since the $H_1F_7Ma$-DVB copolymer coating is very close to the theoretical limit of 120°, it emerges as an optimal solution. Besides this static performance, $H_1F_7Ma$-DVB copoylmer also demonstrates suitable dynamic behavior. Only the $H_1F_7Ma$-DVB copolymer coating (third row in FIG. 5A) allows the droplet to recoil and roll away after impact. In the other cases (untreated or 100% DVB fabrics) droplets remain attached to the fabric. FIG. 5A shows bare polyester fabric (top), DVB homopolymer coated fabric (middle), and $H_1F_7Ma$-DVB copolymer coated fabric (bottom), wherein the time between frames is 1 ms. The top and middle cases show droplet adhesion after impact and subsequent absorption by the fabric. Only $H_1F_7Ma$-DVB case shows roll off behavior and water resistance. As a consequence, a liquid layer can build on top of the fabric, decreasing its breathability and locally increasing the water vapor content that facilitates condensation within the structure. To further reduce droplet adhesion, we propose to mechanically roughen the outermost layer of the fabric by sandblasting it and applying the coating onto the structured fabric. This process was chosen because avoids damage of the overall mechanical properties of the fabric, as would result from chemical etching. Furthermore, the process is fast, simple, and inexpensive (as compared to, for example, plasma etching). It was observed, as shown in FIG. 5B, that the efficient creation of a micrometric high aspect ratio texture was done by sandblasting a PET fabric for 10 seconds with 10-micron size particles. As a result, impacting droplets can now completely bounce of the surface (as shown in FIG. 5B, bottom) instead of only being able to roll off (as observed without micro-texture, FIG. 5A, bottom). In FIG. 5B, the main image and inset view correspond to a ×500 and ×1000 magnification factor respectively.

Example 3

The following example describes the durability of hydrophobic polymer coating synthesized by iCVD.

Figure 6A:
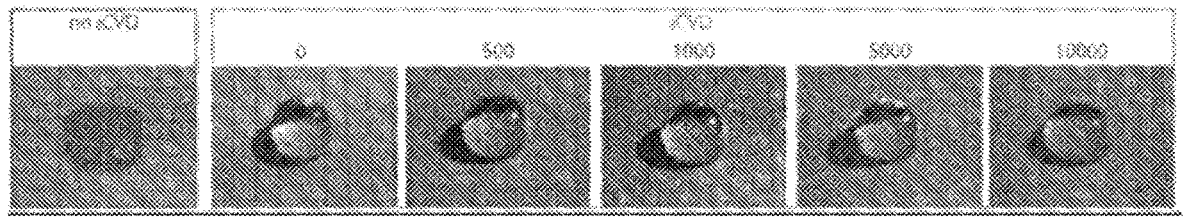
FIG. 6A shows a comparison between a non-coated fabric and an initiated chemical vapor deposition coated fabric exposed from 0 to 10000 abrading strokes, according to certain embodiments.
Figure 6B:
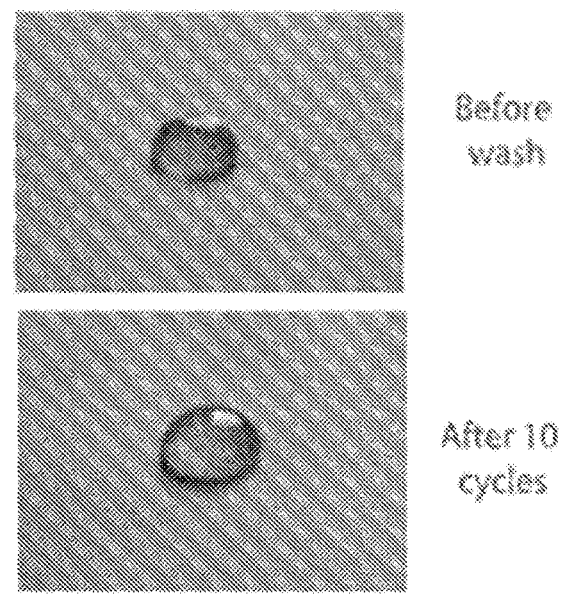
FIG. 6B shows a water drop deposited on an initiated chemical vapor deposition coated fabric before (top) and after (bottom) 10 washing cycles, according to certain embodiments.
Figure 6C:
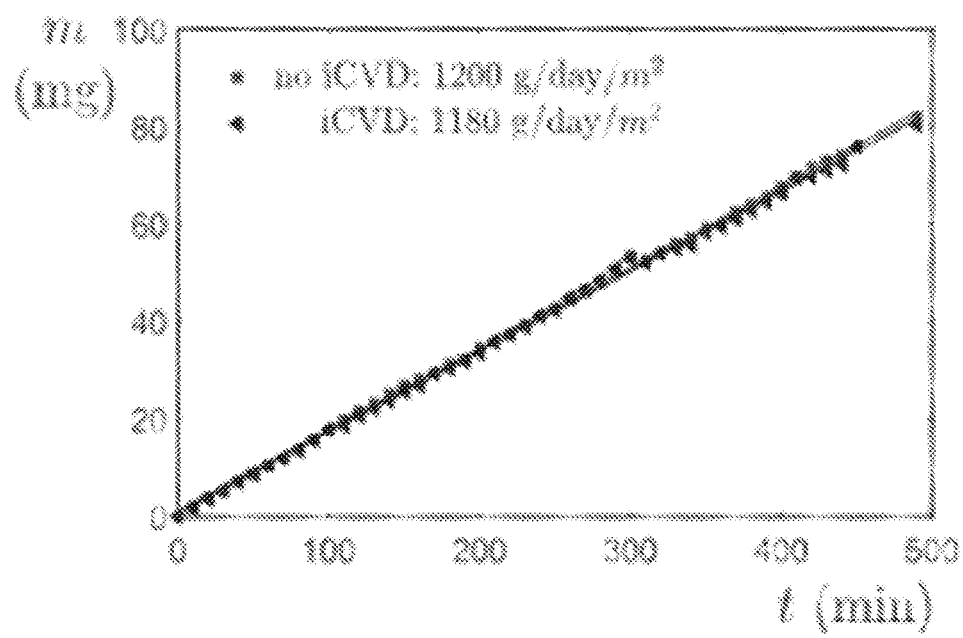
FIG. 6C shows evaporative mass loss as a function of time for initiated chemical vapor deposition coated and non-coated fabrics, according to one set of embodiments.

From an everyday application's viewpoint, the durability of the non-wetting fabric is a critical issue. Physical damages can likely occur from abrasions, such as the one originated by the encountering between fabrics. To characterize this type of mechanical durability a laundering test consisting of 10 cold wash machine cycles was performed and no apparent wetting behavior modification was observed (see FIG. 6B). In addition, abrasion tests (ISO 12947) were performed by abrading the fabric with an increasing number of strokes. FIG. 6A shows the wetting behavior of a 20 µL water droplet, and how the wetting behavior remains unchanged when deposited onto an iCVD coated fabric abraded up to 10000 times, confirming its durability (above 10000 strokes, fiber damage and breakage became apparent). Shown in FIG. 6A, a PET fabric (no iCVD, no abrasion) shows complete absorption of an initial water drop compared to fabrics coated by iCVD exposed to increasing number of abrading strokes, from 0 to 10000 (from left to right). The pictures were taken 5 minutes after initial deposition of a 20 µL water drop.

Figure 5C:
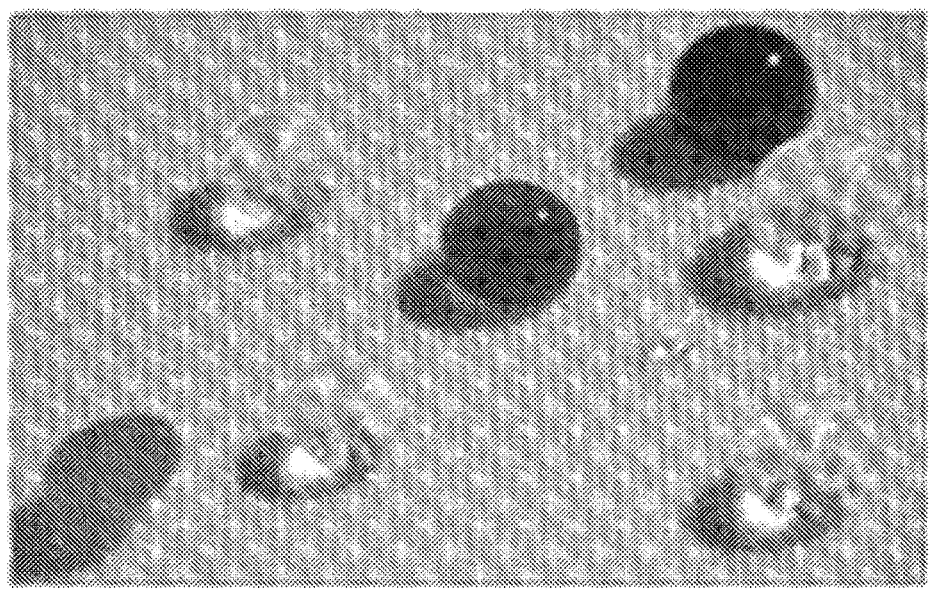
FIG. 5C shows the resistance of different liquids on polyester fabric coated with $H_1F_7$Ma-DVB, according to certain embodiments.
Figure 5D:
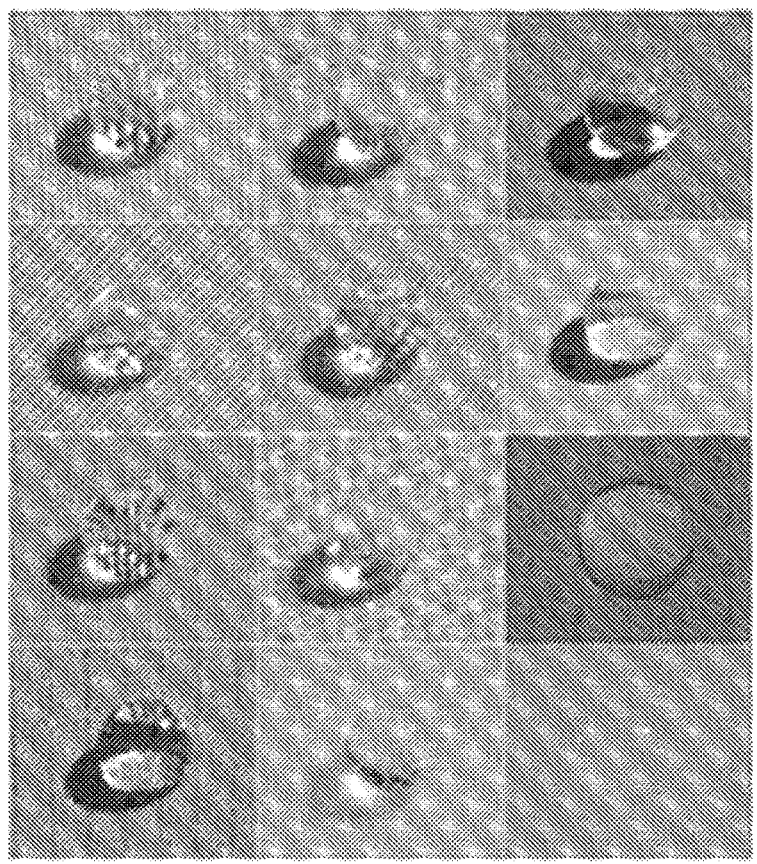
FIG. 5D shows water deposited on different types of $H_1F_7$Ma-DVB coated fabrics, according to certain embodiments.

Very good performance and chemical durability was observed for a wide variety of liquids, as shown in FIG. 5C. FIG. 5C shows different liquids on polyester fabric (duchesse luxury satin weave) coated with $H_1F_7Ma$-DVB copolymer, including soy sauce (top right, black drop), coffee (middle, black drop), ketchup sauce (bottom left non-spherical drop), HCl (top left transparent drop), NaOH (bottom right transparent drop) and water (remaining transparent drops). No modification of the coated textiles was observed after soaking them for 24 hours in harsh acids or bases (HCl 37% and NaOH 50%). In addition, since iCVD allows for ultra-thin conformal coating, initial breathability of the fabric can be maintained. FIG. 5C shows how the initial breathability ($1200 \pm 20$ g/day/m$^2$) of a non-coated fabric remains almost unchanged after iCVD deposition ($1180 \pm 20$ g/day/m$^2$). The small difference (1.7% lower breathability after deposition) is in very good agreement with the 1% thickness change and emphasizes the importance of being able to deposit ultrathin coatings. Regarding low surface tension oils, slower impregnation dynamics was observed as compared with the bare fabrics. In order to address a wider variety of substrates, fabrics with different weaves (duchesse, luxury duchesse, georgette, and plain), different materials (cotton, silk, linen and wool) and even more general substrates such as flat nylon, silicon wafer, paper, and nano-textured surfaces (all showing super hydrophobic behavior, see FIG. 5D) were coated. The first column of FIG. 5D shows different polyester weaves: from top to bottom, duchesse satin, duchesse luxury satin, georgette and plain weave. The second column shows different organic materials: cotton, silk, linen and wool, and the third column shows wide range of possible other substrates: silicon nanograss, paper, silicon wafer and nylon.

Example 4

The following example describes the iCVD process for depositing homopolymers and copolymers.

All iCVD depositions were conducted in a custom-built reactor. Tert-butyl peroxide (TBPO, 97%) initiator was introduced at room temperature into the chamber through a mass flow controller. The initiator underwent activation by hot filament wires placed 2 cm above the samples. The specimen temperature was controlled via a back-cooling recirculation water system. Monomers were heated to 60° C. for DVB (80%) and 80° C. for $H_1F_7Ma$ (25G), and their flow rates were controlled using needle valves. The chamber pressure was maintained constant during the whole process using a throttle valve. Polymerization thickness was monitored in situ with laser interferometry through the transparent quartz top cover and growth was interrupted when a thickness around 100 nm was attained (typically 10 minutes) ensuring initial color remained unchanged after deposition. The overall composition of each compound was estimated by evaluating their partial pressure and deducting the corresponding fractional saturation percentage.

Example 5

The following example describes methods for characterizing the (co)polymer coating.

For each deposition, a flat silicon wafer was placed into the chamber to allow post-polymerization characterization. Film thickness was confirmed through variable-angle ellipsometric spectroscopy (VASE, M-2000, J. A. Woollam), in good agreement with the in-situ laser interferometric measurement. All VASE thickness measurements were performed at 60°, 70°, and 80° incidence angle using 190 wavelengths from 315 to 718 nm. A nonlinear least-squares minimization was used to fit ellipsometric data of the films to the Cauchy-Urbach model. The thickness was obtained upon convergence of the algorithm. Fourier transform infrared (FTIR) was performed on a Nicolet Nexus 870 ESP spectrometer equipped with a mercury cadmium tellurium (MCT) detector and KBr beam splitter in normal transmission mode. For the liquid $H_1F_7Ma$ monomer, a DTGS detector was used in combination with a liquid transmission cell (Pike, 6 µm path length). Spectra over 350-3500 cm$^{-1}$ with a resolution of 4 cm$^{-1}$ were collected and averaged over 256 scans to improve signal-to-noise ratio. All spectra were baseline-corrected. Differential Scanning calorimetry (Discovery DSC, TA instruments) was used to measure the glass transition of $H_1F_7Ma$ homopolymer by ramping up from $-90°$ C. to 120° C. by 2.5° C./min after initial and final temperature equilibration for 5 minutes.

The laundering test was performed in a top load washing machine and drying was allowed in between each cold wash cycle. Abrasion test ISO 12947 was performed by SDL Atlas on a M235 Martindale abrasion tester with 9 kPA pressure weight and 500, 1000, 5000 10000 cycles on PET and cotton iCVD coated fabrics. A Lisajoux pattern and a 100% standard wool abradant where used. The breathability test (ISO 2528 A-2) was performed by measuring the evaporative mass loss through the cylindrical top open section (16 mm diameter) of a container (20 ml 27×57 glass vial) filled with 16 ml water covered with a PET iCVD coated fabric using a microbalance (Mettler Toledo MS). Data was recorded for 500 minutes in a room at 21° C. and results were compared to the case of an untreated fabric.

Example 6

The following example describes methods for sandblasting texturing surfaces.

Sandblasting allows imprinting of textures onto a substrate by bombarding aluminum oxide micro-particles into the fibers of the fabric. In all texturing experiments, a sandblasting gun (Badger) connected to a compressed air source (70 psi) is held perpendicular to the fabric at 3 cm from gun nozzle exit for 10 seconds. Because the target substrates are malleable they are mounted and backed by a rigid glass sheet and consequently, each particle impact results in an anticipated plastic deformation. The deformation size is expected to be proportional to the size of the initial impacting particle. Since a typical fiber size is 10 microns, a different grit size ranging from 4 to 30 microns in size (Kramer Industries, grits 1200, 600, 360, and 320 corresponding to average particle sizes of 4, 11, 23, and 30 μm respectively) was used. Because energy is absorbed during the collision, particles can be embedded into the fiber if they don't have enough elastic energy to rebound. To address this problem, all samples were sonicated for 2 minutes in water after sandblasting to remove any stuck particles.

To assess the effect of sandblasting on wetting properties, the droplet roll-off angle as a function of the blasting particle size corresponding to SEM pictures was evaluated. Increasing the sandblasting particle size allows for the reduction of the sticking behavior. Since sandblasting modifies the visual appearance of the fabric, droplet impact measurements were performed to find the optimum between minimizing sandblasting damage (leading to appearance modification) and optimizing wetting performances. For blasting particle sizes of 4 μm and below, drops stopped gliding down the slope after several diameter lengths and finally remained pinned. However, for blasting particle sizes of 11 μm and above, all drops were able to completely bounce off and detach from the fabric, making particle sizes of 11 μm (same size as fiber diameter of 10 μm) the best candidate.

What is claimed is:

1. An article, comprising:
   a crosslinked polymer matrix crosslinked with divinylbenzene, wherein the crosslinked polymer matrix comprises pendant groups in an amount between 40 wt. % and 70 wt. % based on a total weight of the crosslinked polymer matrix, wherein the pendant groups comprise a spacer group directly attached to a $C_7$ perfluoroalkyl group, wherein the spacer group is a —C(O)—O—CH$_2$— group, wherein the crosslinked polymer matrix has a water contact angle of greater than 90°, and wherein the crosslinked polymer matrix is covalently bound to a substrate.

2. The article of claim 1, wherein the $C_7$ perfluoroalkyl group is attached to a backbone of the crosslinked polymer matrix via the spacer group.

3. The article of claim 1, wherein the crosslinked polymer matrix has a water contact angle hysteresis of less than or equal to about 30°.

4. The article of claim 1, wherein the crosslinked polymer matrix is deposited onto the substrate by initiated chemical vapor deposition.

5. The article of claim 1, wherein the substrate is a fabric or paper.

6. The article of claim 1, wherein the crosslinked polymer matrix has a thickness of at least 5 nm.

7. The article of claim 1, wherein the pendant groups are present on a surface of the crosslinked polymer matrix.

8. The article of claim 1, wherein the pendant groups are present in an interior of the crosslinked polymer matrix.

9. The article of claim 1, wherein the crosslinked polymer matrix comprises divinylbenzene in an amount between 5 wt. % and 70 wt. % based on a total weight of the crosslinked polymer matrix.

10. The article of claim 1, wherein the substrate comprises microscale and/or nanoscale features.

11. The article of claim 10, wherein the substrate has a Wenzel roughness factor of greater than or equal to 1.

12. The article of claim 1, wherein the article is capable of withstanding greater than or equal to 500 and less than or equal to 10,000 ISO 12947 abrasion strokes.

13. The article of claim 12, wherein the article is capable of withstanding greater than or equal to 1,000 and less than or equal to 10,000 ISO 12947 abrasion strokes.

14. The article of claim 12, wherein the article is capable of withstanding greater than or equal to 5,000 and less than or equal to 10,000 ISO 12947 abrasion strokes.

\* \* \* \* \*